(12) United States Patent
Gedevanishvili et al.

(10) Patent No.: US 7,934,510 B2
(45) Date of Patent: May 3, 2011

(54) CIGARETTE WRAPPER WITH NANOPARTICLE SPINEL FERRITE CATALYST AND METHODS OF MAKING SAME

(75) Inventors: Shalva Gedevanishvili, Richmond, VA (US); Firooz Rasouli, Pully (CH); Wei-Jun Zhang, Richmond, VA (US); Ping Li, Lausanne (CH)

(73) Assignee: Philip Morris USA Inc., Richmond, VA (US)

( * ) Notice: Subject to any disclaimer, the term of this patent is extended or adjusted under 35 U.S.C. 154(b) by 1170 days.

(21) Appl. No.: 10/972,295

(22) Filed: Oct. 25, 2004

(65) Prior Publication Data

US 2005/0211259 A1  Sep. 29, 2005

Related U.S. Application Data

(60) Provisional application No. 60/514,551, filed on Oct. 27, 2003.

(51) Int. Cl.
*A24B 15/18* (2006.01)
(52) U.S. Cl. ............... 131/334; 131/365; 131/353
(58) Field of Classification Search .................. None
See application file for complete search history.

(56) References Cited

U.S. PATENT DOCUMENTS

| | | | |
|---|---|---|---|
| 3,720,214 A | 3/1973 | Norman et al. |
| 3,807,416 A | 4/1974 | Hedge et al. |
| 3,931,824 A | 1/1976 | Miano et al. |
| 4,108,151 A | 8/1978 | Martin et al. |
| 4,109,663 A | 8/1978 | Maeda et al. |
| 4,119,104 A | 10/1978 | Roth |
| 4,182,348 A | 1/1980 | Seehofer et al. |
| 4,195,645 A | 4/1980 | Bradley, Jr. et al. |
| 4,197,861 A | 4/1980 | Keith |
| 4,450,847 A | 5/1984 | Owens |
| 4,453,553 A | 6/1984 | Cohn |
| 4,489,739 A | 12/1984 | Mattina, Jr. et al. |
| 4,744,374 A | 5/1988 | Deffeves et al. |
| 5,101,839 A | 4/1992 | Jakob et al. |
| 5,105,836 A | 4/1992 | Gentry et al. |
| 5,129,408 A | 7/1992 | Jakob et al. |

(Continued)

FOREIGN PATENT DOCUMENTS

JP  5-111618  5/1993
(Continued)

OTHER PUBLICATIONS

Shepherd Color Company, Material Safety Data Sheet: Black 444, Oct. 2005, www.shepherdcolor.com/msds.asp?item=BK0444.*

(Continued)

*Primary Examiner* — Richard Crispino
*Assistant Examiner* — Michael J Felton
(74) *Attorney, Agent, or Firm* — Buchanan Ingersoll & Rooney PC

(57) ABSTRACT

A wrapper for a smoking article includes nanoparticle spinel ferrite catalyst and a web including cellulosic fibers and an optional web-filler. The web-filler can be a modified web-filler which incorporates the spinel ferrite catalyst. The nanoparticle spinel ferrite catalyst can be a nanoparticle manganese-copper-iron oxide catalyst incorporated in the wrapper and/or a tobacco cut filler. Also provided is a smoking article including a cigarette tobacco rod having a wrapper including a web, a web-filler, and a nanoparticle spinel ferrite catalyst, the web-filler optionally supporting the nanoparticle catalyst. A method of making the wrapper and a method of making a smoking article utilizing the wrapper are also provided.

9 Claims, 14 Drawing Sheets

U.S. PATENT DOCUMENTS

| | | | |
|---|---|---|---|
| 5,143,098 A | | 9/1992 | Rogers et al. |
| 5,211,684 A | | 5/1993 | Shannon et al. |
| 5,258,340 A | * | 11/1993 | Augustine et al. ............... 502/60 |
| 5,284,166 A | | 2/1994 | Cartwright et al. |
| 5,342,484 A | | 8/1994 | Cutright et al. |
| 5,345,951 A | | 9/1994 | Serrano et al. |
| 5,386,838 A | | 2/1995 | Quincy, III et al. |
| 5,388,594 A | | 2/1995 | Counts et al. |
| 5,474,095 A | | 12/1995 | Allen et al. |
| 5,499,636 A | | 3/1996 | Baggett, Jr. et al. |
| 5,598,868 A | | 2/1997 | Jakob et al. |
| 5,666,976 A | | 9/1997 | Adams et al. |
| 5,671,758 A | | 9/1997 | Rongved |
| 5,692,525 A | | 12/1997 | Counts et al. |
| 5,692,526 A | | 12/1997 | Adams et al. |
| 5,728,462 A | | 3/1998 | Arino et al. |
| 5,888,348 A | * | 3/1999 | Hampl, Jr. ................... 162/139 |
| 5,915,387 A | | 6/1999 | Baggett, Jr. et al. |
| 5,988,176 A | | 11/1999 | Baggett, Jr. et al. |
| 5,997,691 A | | 12/1999 | Gautam et al. |
| 6,026,820 A | | 2/2000 | Baggett, Jr. et al. |
| 6,095,152 A | | 8/2000 | Beven et al. |
| 6,138,684 A | | 10/2000 | Yamazaki et al. |
| 6,286,516 B1 | * | 9/2001 | Bowen et al. ................. 131/365 |
| 6,371,127 B1 | | 4/2002 | Snaidr et al. |
| 6,769,437 B2 | | 8/2004 | Hajaligol et al. |
| 6,782,892 B2 | | 8/2004 | Li et al. |
| 6,857,431 B2 | | 2/2005 | Deevi et al. |
| 7,004,993 B2 | | 2/2006 | Pithawalla et al. |
| 7,152,609 B2 | | 12/2006 | Li et al. |
| 7,165,553 B2 | | 1/2007 | Luan et al. |
| 7,168,431 B2 | | 1/2007 | Li et al. |
| 7,228,862 B2 | | 6/2007 | Hajaligol et al. |
| 7,243,658 B2 | | 7/2007 | Deevi et al. |
| 2002/0002979 A1 | | 1/2002 | Bowen et al. |
| 2002/0062834 A1 | | 5/2002 | Snaidr et al. |
| 2002/0157678 A1 | | 10/2002 | Hampl, Jr. |
| 2003/0037792 A1 | | 2/2003 | Snaidr et al. |
| 2003/0075193 A1 | * | 4/2003 | Li et al. ......................... 131/364 |
| 2003/0188758 A1 | | 10/2003 | Hajaligol et al. |
| 2005/0051185 A1 | | 3/2005 | Rasouli et al. |

FOREIGN PATENT DOCUMENTS

| | | |
|---|---|---|
| WO | WO 87/06104 A1 | 10/1987 |
| WO | WO 00/40104 A1 | 7/2000 |
| WO | WO 02/24005 A2 | 3/2002 |
| WO | WO 03/053177 A1 | 7/2003 |
| WO | WO 03/086115 A1 | 10/2003 |

OTHER PUBLICATIONS

CAS Registry, Chemical Name: C.I. Pigment Black 26, Registry No. 68186-94-7, accessed Jan. 23, 2008.*

Krylova, et al., "Weakly bound oxygen in catalytic CO oxidation and exoemission from complex oxides having a spinel structure", Sep. 1997, Plenum Publishing, Russian Chemical Bulletin, vol. 46, No. 9, pp. 1543-1545.*

English translation of: Y. Li et al. "Use of iron ore catalyst for purification of automobile exhaust", Northeast University, Shenyang, CN, 1994, pp. 17-19. Translation title, "Study on Iron Ore Catalyst for Purifying Autombile Exhaust".*

International Preliminary Report on Patentability for PCT/IB2004/003655 dated May 1, 2006.

R. R. Baker, "Mechanisms of Smoke Formation and Delivery", *Advances in Tobacco Science*, 1980, pp. 184-224.

R. R. Baker, "Variation of the Gas Formation Regions within a Cigarette Combustion Coal during the Smoking Cycle", *Beritrāge zur Tabakforschung International*, , vol. 11, No. 1, 1981, pp. 1-17.

G.-M. Schwab et al., "Die katalytische Verstärkung im Hopcalite (Catalytic promotion in hopcalite)", *Zeitschrift für Physikalische Cemie Neue Folge*, 1977, pp. 109-120.

M. Flytzani-Stephanopoulos, "Nanostructured Cerium Oxide Ecocatalysts", *MRS Bulletin*, Nov. 2001, pp. 885-889.

A. B. Lamb et al, "The Removal of Carbon Monoxide from Air", *J. Ind. Eng. Chem.*, vol. 12, No. 3, Mar. 1920, pp. 213-221.

L. S. Puckhaber et al., "Reactivity of Copper Manganese Oxides", *Solid State Ionics*, 32/33, 1989, pp. 206-213.

G. J. Hutchings et al., "Effect of preparation conditions on the catalytic performance of copper manganese oxide catalysts for CO oxidation", *Applied Catalysis A: General*, 166, 1998, pp. 143-152.

Y. Tanaka et al., "Water gas shift reaction for the reformed fuels over Cu/MnO catalysts prepared via spinel-type oxide", *J. Catal.*, 215, 2003, pp. 271-278.

A. A. Mirzaei et al., "Ambient temperature carbon monoxide oxidation using copper manganese oxide catalysts: Effect of residual $Na^+$ acting as catalyst poison", *Catal. Commun.*, 4, 2003, pp. 17-20.

G. J. Hutchings et al., "Ambient temperature CO oxidation using copper manganese oxide catalysts prepared by coprecipitation: effect of ageing on catalyst performance", *Catal. Lett.*, 42, 1996, pp. 21-24.

I. Spassova et al., "Coprecipitated $CuO-MnO_x$ Catalysts for Low-Temperature CO-NO and $CO-NO-O_2$ Reactions", *J. Catal.*, 185, 1999, pp. 43-57.

S. B. Kanungo, "Physicochemical Properties of $MnO_2$ and $MnO_2$ and $MNO_2$-CuO and Their Relationship with the Catalytic Activity for $H_2O_2$ Decomposition and CO Oxidation", *J. Catal.*, 58, 1979, pp. 419-435.

F. M. Gottschalk et al., "Manganese Oxide Water-Gas Shift Catalysts Initial Optimization Studies", *Appl. Catal.*, 51, 1989, pp. 127-139.

P. Li et al., "In Situ TP-FTIR Study of $Cu_2MnO_x$ Catalyst in CO Oxidation", *J. Nat. Gas Chem.*, vol. 4, No. 3, 1995, pp. 302-310.

F. C. Buciuman et al., "A Spillover approach to oxidation catalysis over copper and manganese mixed oxides", *Chem. Eng. Process.*, 38, 1999, pp. 563-569.

P. Fortunato et al., "Generation of mixed metal oxides by use of an ultrasonic aerosol thermal decomposition process", *Solid State Ionics*, 101-103, 1997, pp. 85-89.

I. V. Krylova et al., Weakly bound oxygen in the catalytic CO oxidation and exoemission from complex oxides having a spinel structure, *Russ. Chem. Bull.*, vol. 46, No. 9, Sep. 1997, pp. 1543-1545.

A. Wöllner et al., "Characterization of mixed copper-manganese oxides supported on titania catalysts for selective oxidation of ammonia", *Appl. Catal. A:Gen.*, 94, 1993, pp. 181-203.

G. X. Qi et al., "A novel catalyst for DME synthesis from CO hydrogenation 1. Activity, structure and surface properties", *J. Mol. Catal. A: Chem.*, 176, 2001, pp. 195-203.

M. Wojciechowska et al., "The structure and catalytic activity of the double oxide system $Cu-Mn-MgF_2$", *Appl. Catal. A: Gen.*, 237, 2002, pp. 63-70.

H. T. Wang et al., "Catalytic purification of flue gas from civil-used stove", *Catal. Today*, 53, 1999, pp. 661-667.

N. B. Stankova et al., "Catalytic Reduction of NO with CO on Active Carbon-Supported Copper, Manganese, and Copper-Manganese Oxides", *J. Colloid Interface Sci.*, 241, 2001, pp. 439-447.

P. Li et al., "The removal of carbon monoxide by iron oxide nanoparticles", *Appl. Catal. B: Environ.*, 43, 2003, pp. 151-162.

J. S. Moore et al., *Kinetics and Mechanism*, Third Edition, John Wiley & Sons, 1981, "Experimental Methods and Treatment of Data", pp. 37-82.

H. G. Stenger, Jr. et al., "Chlorine capture by catalyst-sorbents for the oxidation of air pollutants", *Appl. Catal. B: Environ.*, 2, 1993, pp. 117-130.

Y. Li et al., "Use of iron ore catalyst for purification of automobile exhaust", Northeast University, Shenyang, CN, 1994, pp. 17-19.

D. Zhao et al., "Nonionic Triblock and Star Diblock Copolymer and Oligomeric Surfactant Syntheses of Highly Ordered, Hydrothermally Stable, Mesoporous Silica Structures", *J. Am. Chem. Soc.*, vol. 120. No. 24, 1998, pp. 6024-6036.

S. Paldey et al., "Evaluation of a spinel based pigment system as a CO oxidation catalyst", *Appl. Catal. B: Environ.*, 56, 2005, pp. 241-250.

Commonly Owned Applications in Connection With U.S. Appl. No. 10/972,295 U.S. Appl. No. 10/460,617, Preparation of Intermetallics by Metallo-Organic Decomposition, filed Jun. 13, 2003.

U.S. Appl. No. 10/460,631, Catalyst to Reduce Carbon Monoxide in the Mainstream Smoke of a Cigarette, filed Jun. 13, 2003.

U.S. Appl. No. 10/460,302, Oxidant/Catalyst Nanoparticles to Reduce Tobacco Smoke Constituents Such As Carbon Monoxide, filed Jun. 13, 2003.

U.S. Appl. No. 10/972,205, Formation and Deposition of Sputtered Nanoscale Particles in Cigarette Manufacture, filed Oct. 25, 2004.
U.S. Appl. No. 10/972,209, In Situ Synthesis of Composite Nanoscale Particles, filed Oct. 25, 2004.
U.S. Appl. No. 10/972,201, Tobacco Cut Filler Including Metal Oxide Supported Particles, filed Oct. 25, 2004.
U.S. Appl. No. 10/972,202, Preparation of Mixed Metal Oxide Catalysts From Nanoscale Particles, filed Oct. 25, 2004.
U.S. Appl. No. 10/972,203, Cigarettes and Cigarette Components Containing Nanostructured Fibril Materials, filed Oct. 25, 2004.
U.S. Appl. No. 10/866,181, Cigarette Wrapper With Catalytic Filler and Methods of Making Same, filed Jun. 14, 2004.
U.S. Appl. No. 10/870,449, Shredded Paper With Catalytic Filler in Tobacco Cut Filler and Methods of Making Same, filed Jun. 14, 2004.
U.S. Appl. No. 10/972,206, Reduction of Carbon Monoxide in Smoking Articles Using Transition Metal Oxide Clusters, filed Oct. 25, 2004.
U.S. Appl. No. 10/868,015, Silver and Silver Oxide Catalysts for the Oxidation of Carbon Monoxide in Cigarette Smoke, filed Jun. 16, 2004.
U.S. Appl. No. 10/972,208, Reduction of Carbon Monoxide and Nitric Oxide in Smoking Articles Using Nanoscale Particles and/or Clusters of Nitrided Transition Metal Oxides, filed Oct. 25, 2004.
U.S. Appl. No. 11/252,773, Palladium-Containing Nanoscale Catalysts, filed Oct. 19, 2005.
U.S. Appl. No. 10/972,207, Use of Oxyhydroxide Compounds in Cigarette Paper for Reducing Carbon, filed Oct. 25, 2004.
U.S. Appl. No. 10/972,204, In Situ Synthesis of Composite Nanoscale Particles, filed Oct. 25, 2004.
U.S. Appl. No. 11/653,856, Cigarette Components Having Encapsulated Catalyst Particles and Methods of Making and Use Thereof, filed Jan. 17, 2007.
U.S. Appl. No. 11/636,589, Supported Catalysts, filed Dec. 11, 2006.
U.S. Appl. No. 11/729,951, In Situ Formation of Catalytic Cigarette Paper, filed Mar. 30, 2007.
U.S. Appl. No. 11/698,192, Catalysts to Reduce Carbon Monoxide Such as in the Mainstream Smoke of a Cigarette, filed Jan. 26, 2007.
U.S. Appl. No. 10/950,663, Nanocomposite Copper-Ceria Catalysts for Low Temperature or Near-Ambient Temperature Catalysis and Methods for Making Such Catalysts, filed Sep. 28, 2004.
U.S. Appl. No. 11/252,849, Gold-Ceria Catalyst for Oxidation of Carbon Monoxide, filed Oct. 19, 2005.
U.S. Appl. No. 11/452,995, Gold-Ceria Catalyst for Oxidation of Carbon Monoxide, filed Jun. 15, 2006.
U.S. Appl. No. 11/370,843, Method for Forming Activated Copper Oxide Catalysts, filed Mar. 9, 2006.
U.S. Appl. No. 11/371,021, Catalysts for Low Temperature Oxidation of Carbon Monoxide, filed Mar. 9, 2006.
U.S. Appl. No. 11/641,003, Corrugated Catalytic Cigarette Paper and Cigarettes Comprising the Same, filed Dec. 19, 2006.
U.S. Appl. No. 11/077,554, Methods for Forming Transition Metal Oxide Clusters and Smoking Articles Comprising Transition Metal Oxide Clusters, filed Mar. 11, 2005.
U.S. Appl. No. 10/560,396, Cigarette Wrapper With Printed Catalyst, filed Nov. 2, 2006.

* cited by examiner

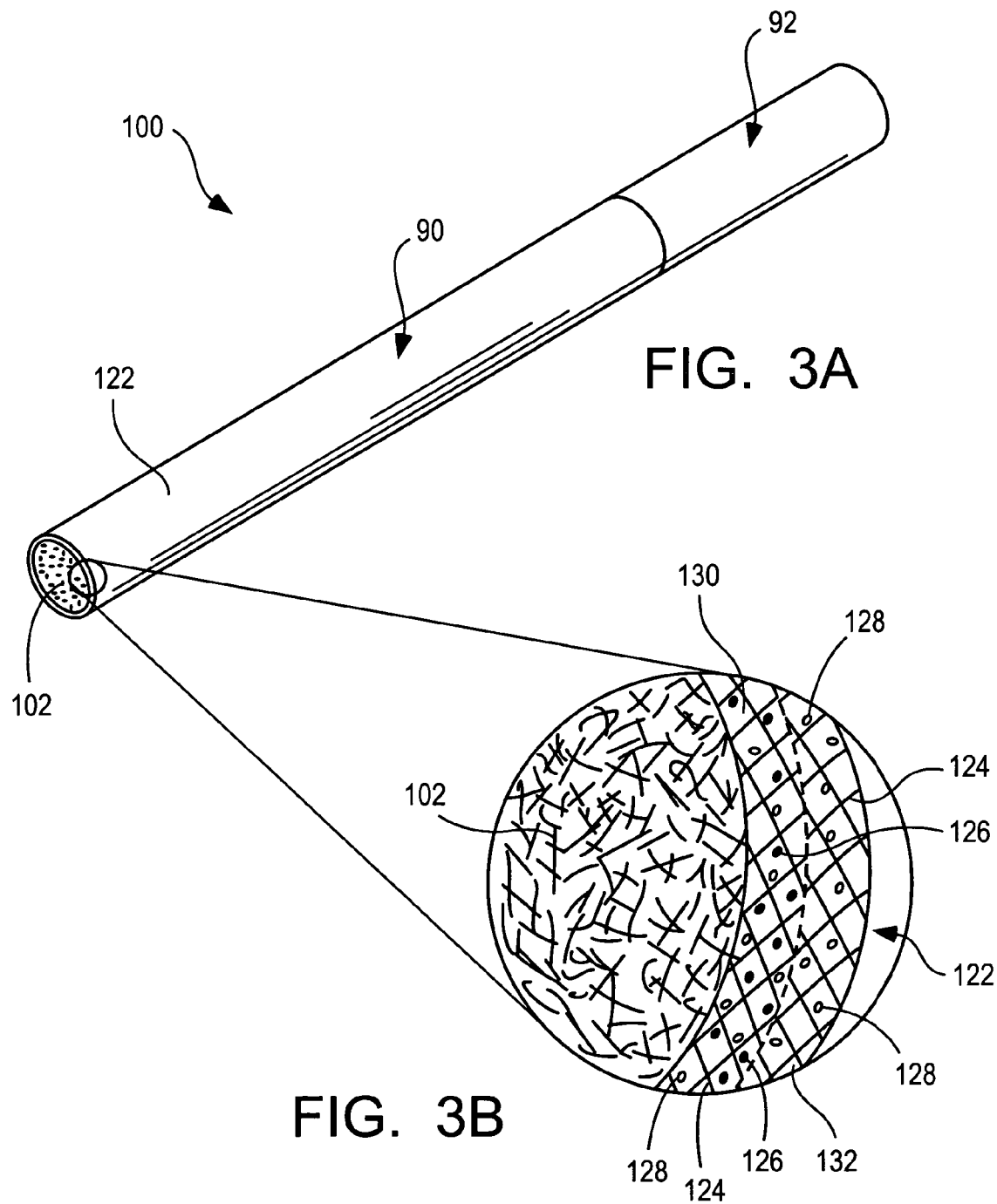

CIGARETTE WRAPPER WITH NANOPARTICLE SPINEL FERRITE CATALYST AND METHODS OF MAKING SAME

This application claims priority under 35 U.S.C. §119 to U.S. Provisional Application No. 60/514,551 entitled CIGARETTE WRAPPER WITH NANOPARTICLE SPINEL FERRITE CATALYST AND METHODS OF MAKING SAME, filed Oct. 27, 2003, the entire content of which is hereby incorporated by reference.

BACKGROUND

Smoking articles, such as cigarettes or cigars, produce both mainstream smoke during a puff and sidestream smoke during static burning. One constituent of both mainstream smoke and sidestream smoke is carbon monoxide (CO). The reduction of carbon monoxide in smoke is desirable.

Despite the developments to date, there remains a need for improved and more efficient methods and compositions for reducing the amount of carbon monoxide in the mainstream smoke of a smoking article during smoking.

SUMMARY

A preferred embodiment of a smoking article comprises a cigarette tobacco rod having a wrapper, the wrapper including a web, an optional web-filler material, and a nanoparticle spinel ferrite catalyst. When provided the web-filler material can support the nanoparticle catalyst. Preferably, the nanoparticle spinel ferrite catalyst comprises a nanoparticle manganese-copper-iron oxide catalyst supported by calcium carbonate.

A preferred method of making a smoking article comprises (i) optionally incorporating a nanoparticle spinel ferrite catalyst in a web-filler material utilized in production of a wrapper to form a catalyst modified web-filler, (ii) making the wrapper, the wrapper including a nanoparticle spinel ferrite catalyst and/or the catalyst modified web-filler, (iii) providing a cut filler comprising tobacco to a cigarette making machine, and (iv) placing the wrapper including the web-filler material supporting a nanoparticle spinel ferrite catalyst around the cut filler to form a tobacco rod portion of the smoking article. The method optionally includes calcining the catalyst modified web-filler prior to step (ii) and/or (v) placing a second wrapper around the tobacco rod portion. Preferably, the calcining comprises first heating the catalyst in a reducing environment and then heating the catalyst in an oxidizing environment.

A preferred embodiment of a wrapper for a smoking article comprises a paper web, an optional web-filler material and a nanoparticle spinel ferrite catalyst. In an embodiment, the catalyst modified web-filler is supported on the paper web, the catalyst modified web-filler including a nanoparticle spinel ferrite catalyst supported by the web-filler material.

Another preferred method of manufacturing cigarette paper comprises (i) supplying a catalyst modified web-filler and a cellulosic material to a head box in a forming section of a papermaking machine, the catalyst modified web-filler including a web-filler material supporting a nanoparticle spinel ferrite catalyst, (ii) depositing an aqueous slurry including the catalyst modified web-filler and the cellulosic material onto the forming section of the papermaking machine to form a base web with the catalyst modified web-filler distributed therein, and (iii) removing water from the base web so as to form an intermediate web. The method optionally includes calcining the catalyst modified web-filler prior to step (iii). Preferably, the calcining comprises first heating in a reducing atmosphere and then heating in an oxidizing atmosphere.

A further preferred method of manufacturing cigarette paper including a catalyst modified web-filler comprises (i) supplying a cellulosic material to a first head box of a forming section of a papermaking machine, (ii) depositing an aqueous slurry from the first head box onto the forming section of the papermaking machine so as to form a base web of the cellulosic material, (iii) distributing a catalyst modified web-filler on the base web, the catalyst modified web-filler comprising a web-filler material supporting a nanoparticle spinel ferrite catalyst, and (iv) removing water from the base web so as to form an intermediate web. The method optionally includes calcining the catalyst modified web-filler prior to step (iii) and/or distributing the catalyst modified web-filler within a fibrous network of the base web, wherein the layer forms a band, a stripe, or a lattice pattern on the intermediate web.

A preferred method of manufacturing a bilayer cigarette paper comprises (i) depositing a first layer of the bilayer cigarette paper from a first head box onto a wire of a papermaking machine, the first head box holding a first furnish composition (ii) depositing a second layer of the bilayer cigarette paper from a second head box onto a portion of the first layer, the second head box holding a second furnish composition, the second furnish composition including a catalyst modified web-filler comprising a web-filler material supporting a nanoparticle spinel ferrite catalyst, and (iii) removing water from the first layer and the second layer so as to form a single sheet of intermediate web. The method optionally includes calcining the catalyst modified web-filler.

A preferred method of manufacturing cigarette paper comprises (i) supplying a furnish including a cellulosic material to a first head box of a forming section of a papermaking machine, (ii) transporting a support web through the papermaking machine, (iii) depositing a catalyst modified web-filler onto the support web, the catalyst modified web-filler including a web-filler material supporting a nanoparticle spinel ferrite catalyst, (iv) depositing an aqueous slurry from the first head box onto the support web so as to form a base web of the cellulosic material with the support web embedded therein, (v) removing water from the base web so as to form a sheet, and (vi) taking up the sheet.

A preferred catalyst modified web-filler utilized in production of a wrapper for a smoking article comprises a web-filler material and a nanoparticle spinel ferrite catalyst supported on the web-filler material.

A preferred method of making a catalyst modified web-filler including a nanoparticle spinel ferrite catalyst supported on a web-filler material comprises (i) forming an aqueous slurry of the nanoparticle spinel ferrite catalyst and the web-filler material, (ii) optionally spreading the aqueous slurry on a support surface, and (iii) drying the aqueous slurry to evaporate water and to form a catalyst modified web-filler.

A further preferred method of making a catalyst modified web-filler including a nanoparticle spinel ferrite catalyst supported on a web-filler material comprises (i) precipitating the nanoparticle spinel ferrite catalyst from a liquid phase onto the web-filler material, (ii) removing at least a portion of the liquid phase, and (iii) drying the web-filler to evaporate a remainder of the liquid phase and to form the catalyst modified web-filler.

Another preferred method of making a catalyst modified web-filler including a nanoparticle spinel ferrite catalyst supported on a web-filler material comprises depositing the nanoparticle spinel ferrite catalyst from a vapor phase onto the web-filler material, wherein the nanoparticle spinel ferrite catalyst comprises copper manganese spinel ferrite, manganese oxide and iron oxide, and the web-filler material is selected from the group consisting of $CaCO_3$, $TiO_2$, $SiO_2$, $Al_2O_3$, $MgCO_3$, MgO and $Mg(OH)_2$.

A preferred embodiment of a cigarette comprises a tobacco rod having a wrapper, the wrapper comprising a web of fibrous cellulosic material and a nanoparticle spinel ferrite catalyst. Optionally the wrapper can comprise a loading of web-filler material, at least some of the web-filler material supporting the nanoparticle spinel ferrite catalyst.

A preferred embodiment of a furnish for use in a papermaking process, the furnish comprising an aqueous slurry including a catalyst modified web-filler and a cellulosic material.

A preferred embodiment of a cigarette wrapper comprises a web having a web-filler material, at least some of the web-filler material comprising a manganese-copper-iron oxide.

BRIEF DESCRIPTION OF THE DRAWING FIGURES

FIG. 3(a) shows an exemplary smoking article with a wrapper including a nanoparticle spinel ferrite catalyst. An inner web region of the wrapper contains catalyst-supporting web-filler material. FIG. 3(b) shows a magnified view of the wrapper.

Figure 4:
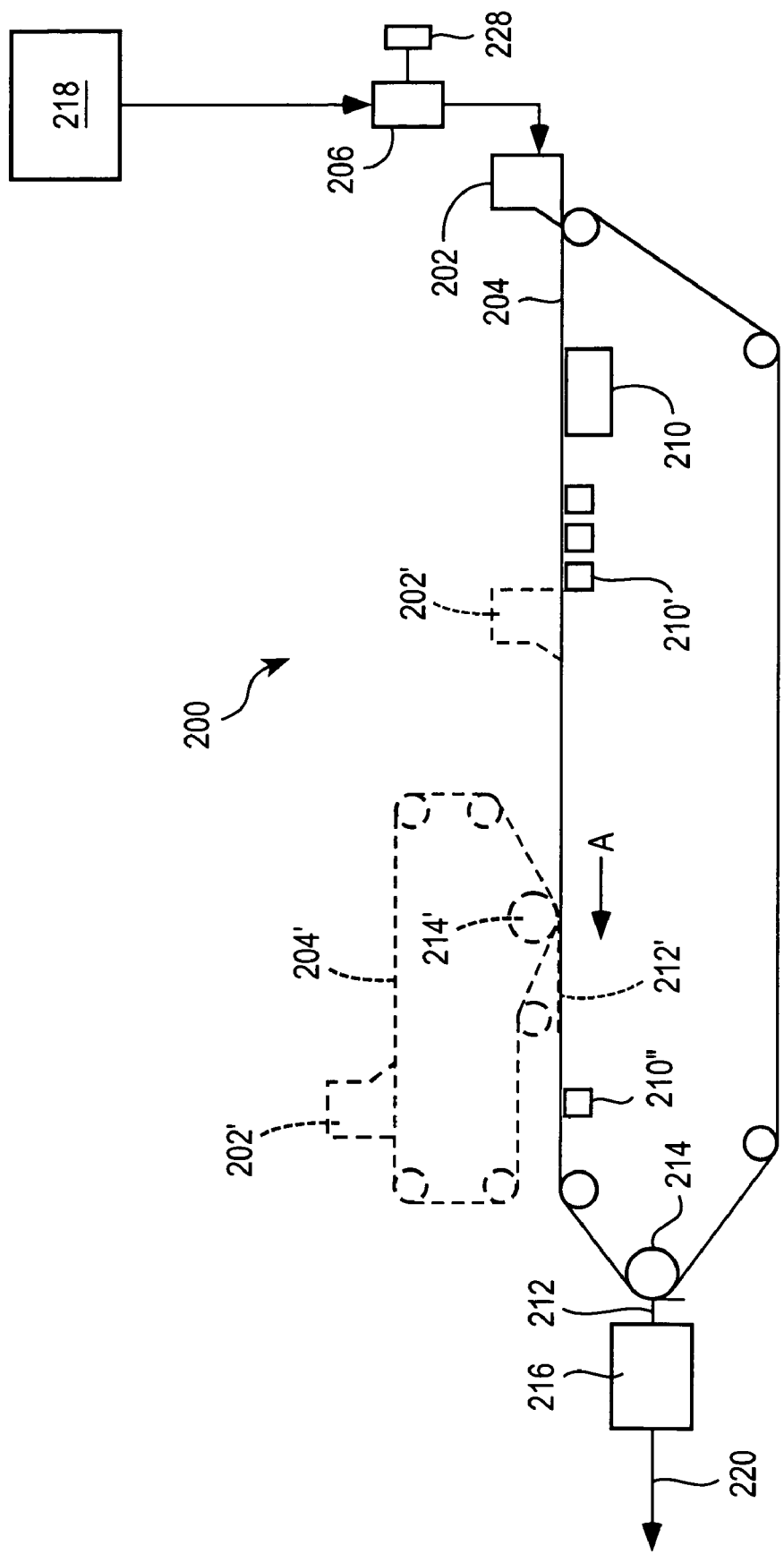

FIG. 4 shows a schematic of a papermaking machine wherein the chalk box may contain a catalyst modified web-filler.

Figure 5:
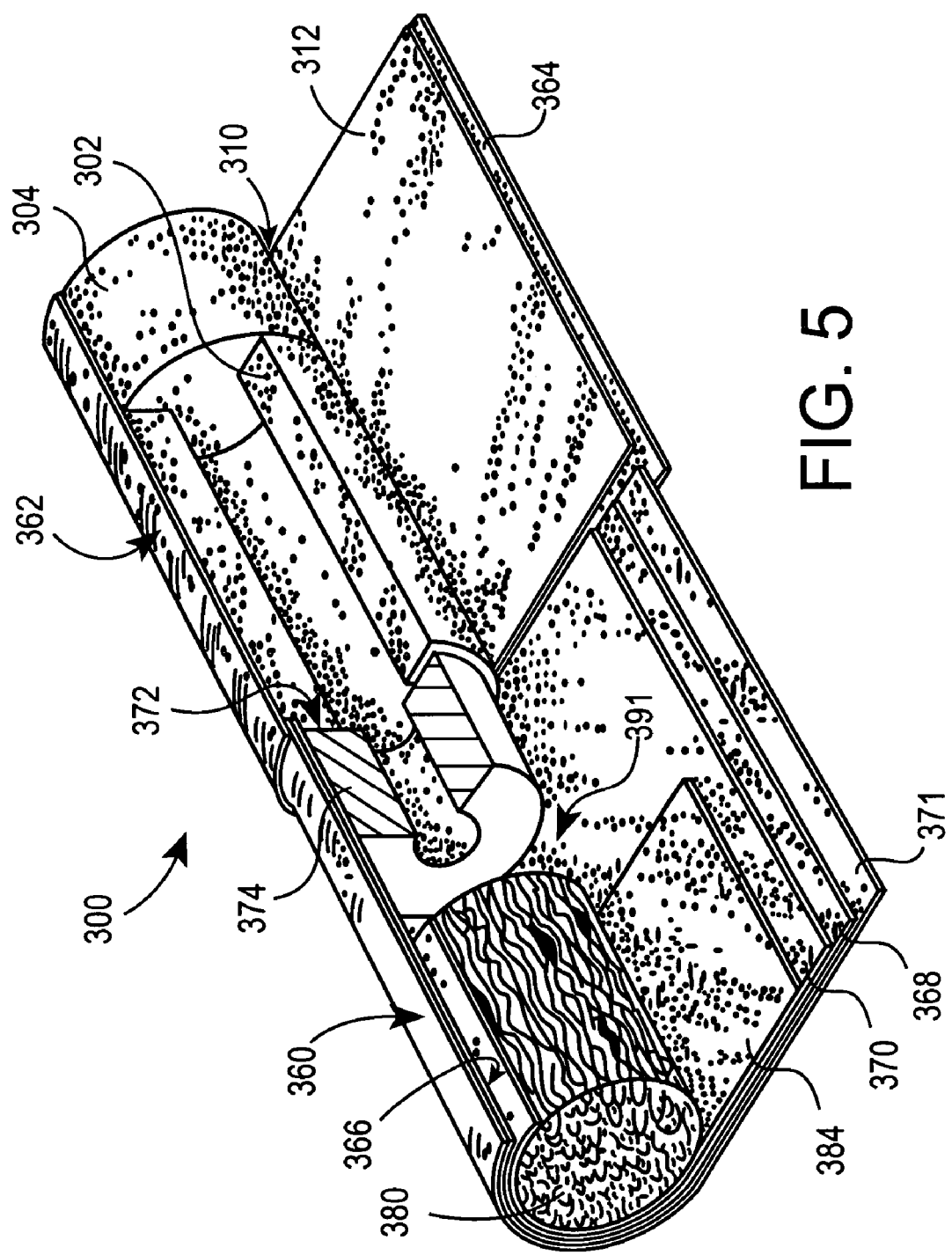

FIG. 5 illustrates one type of construction of a cigarette, which can be used with an electrical smoking device.

Figure 6:
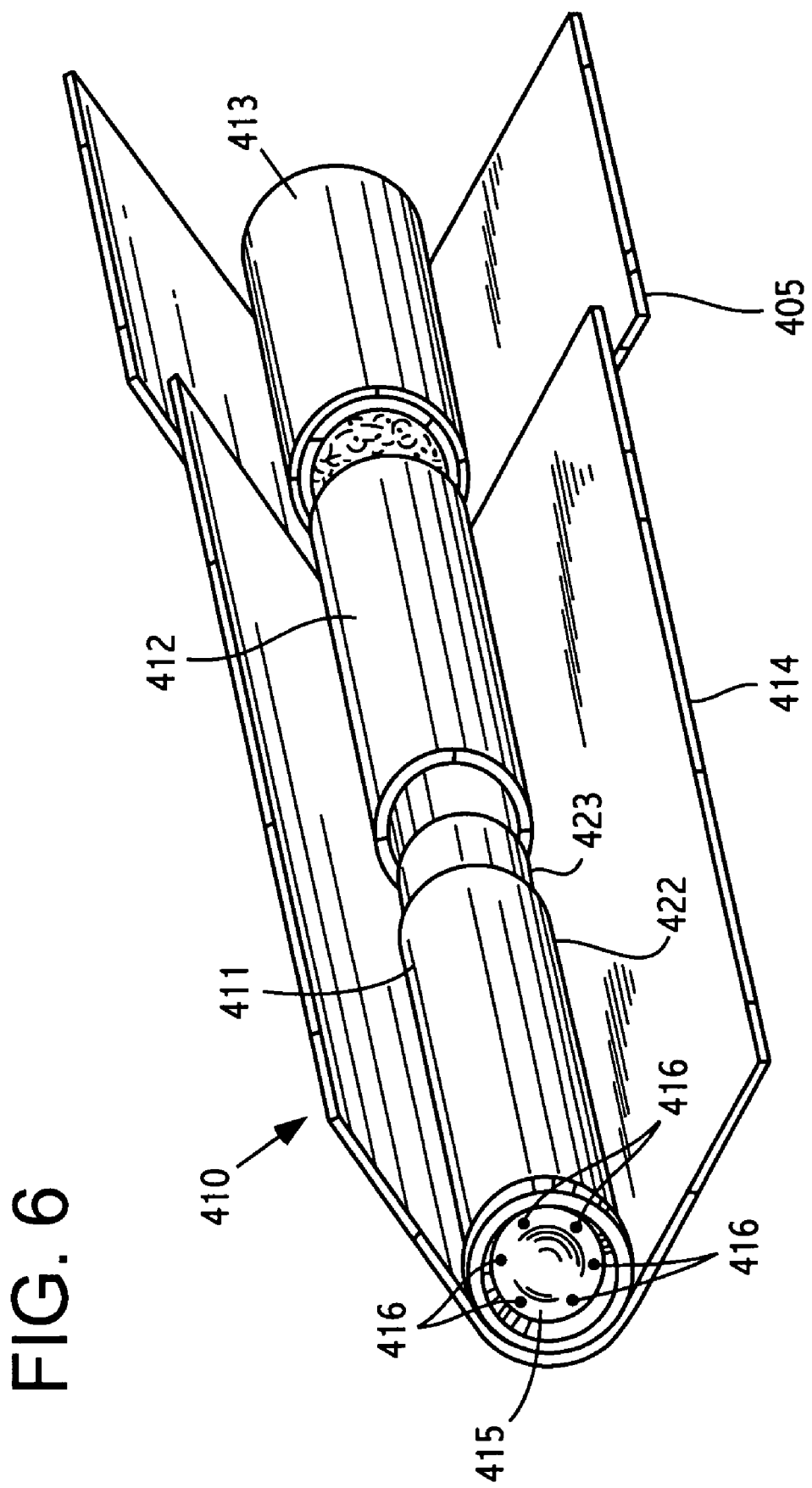

FIG. 6 is a perspective view of a cigarette having catalyst modified paper surrounding a fuel element.

Figure 7:
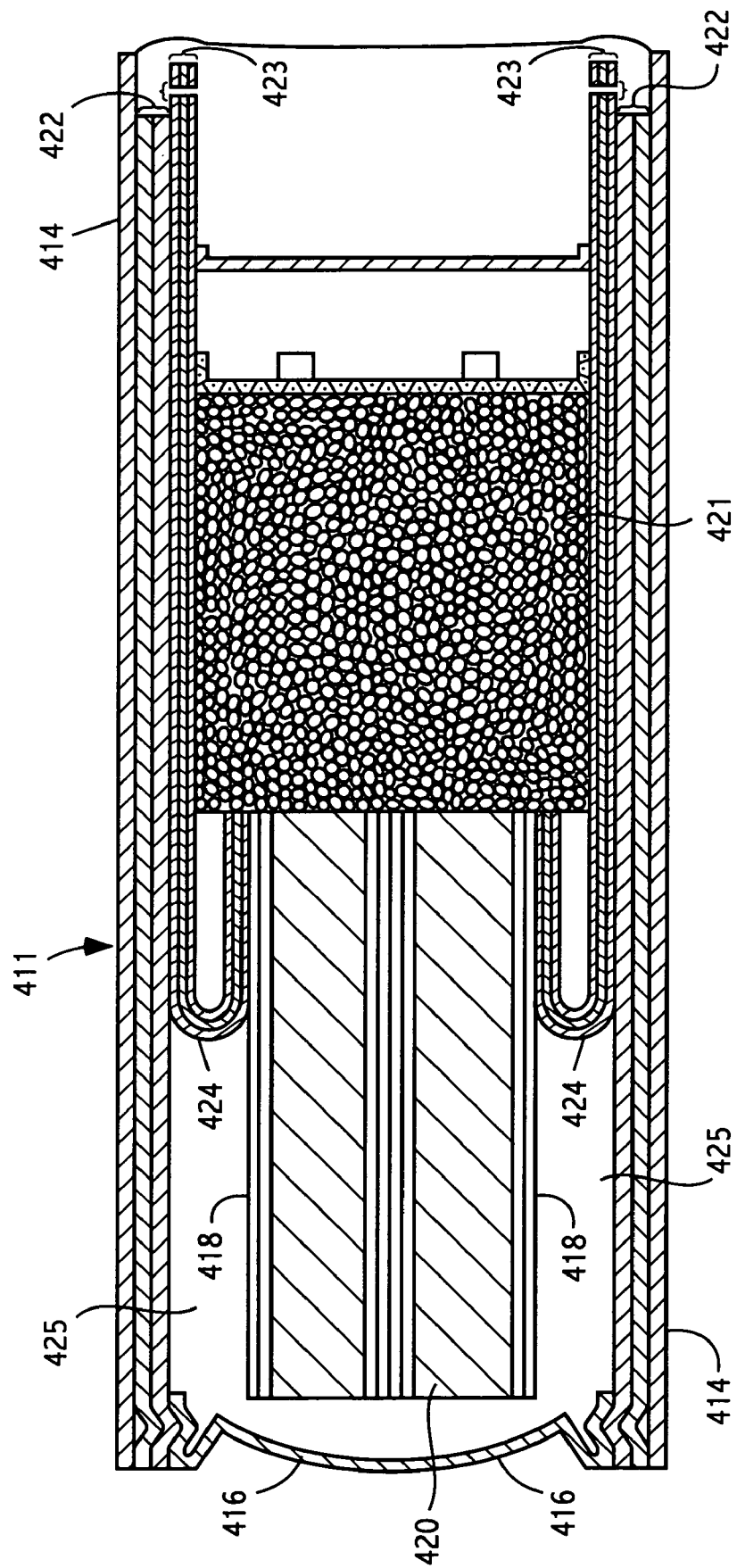

FIG. 7 shows a cross section of the cigarette shown in FIG. 6.

Figure 8:
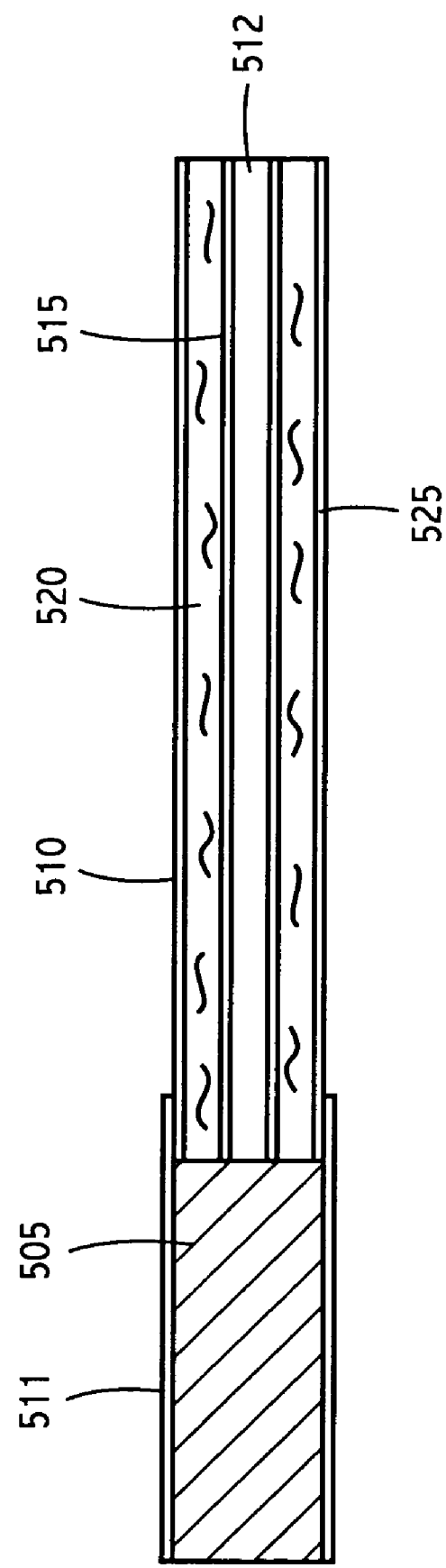

FIG. 8 shows a cross section of a cigarette having catalyst modified wrapper centrally located in the form of a tube.

Figure 9:
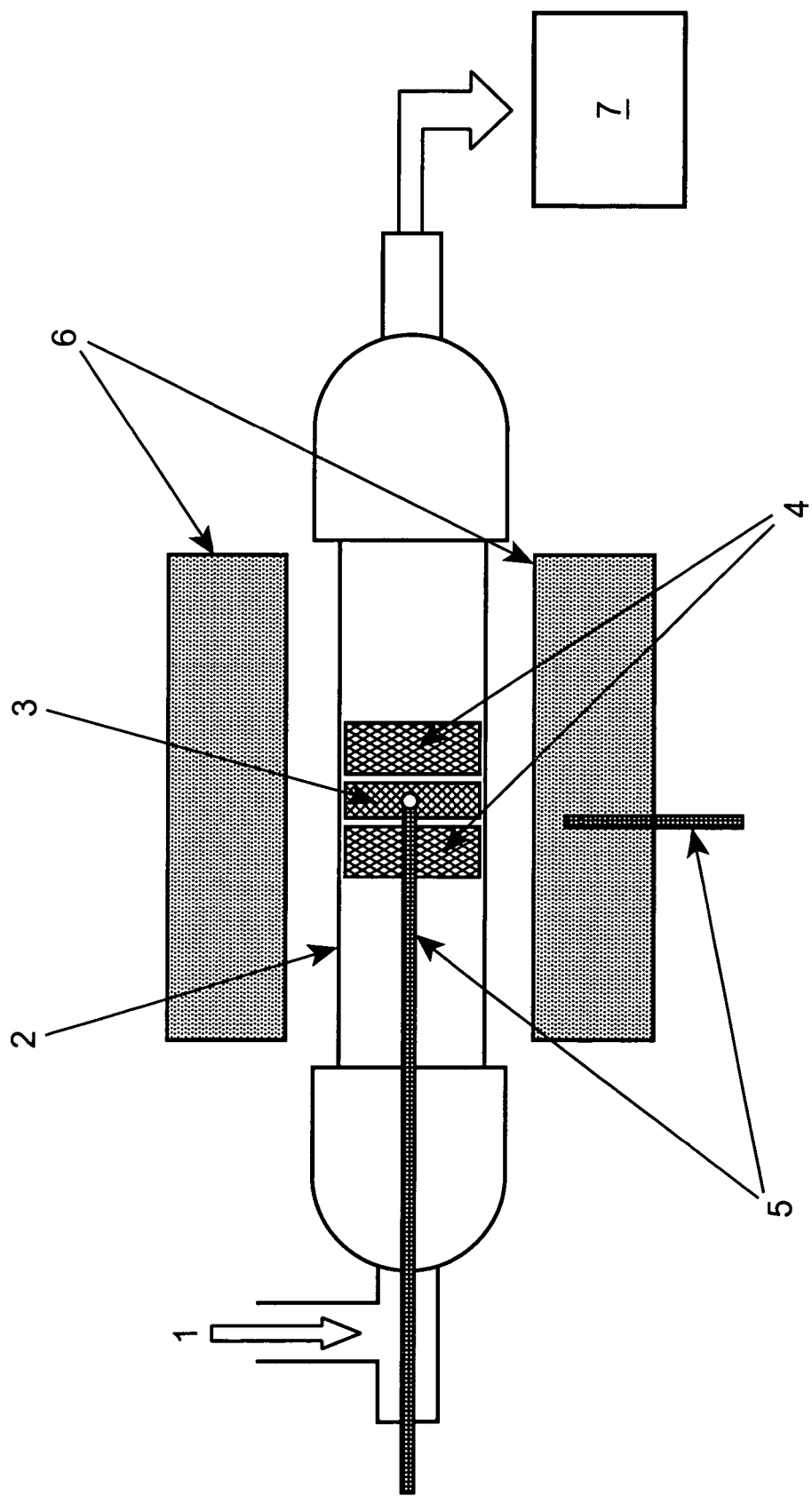

FIG. 9 shows a schematic diagram of a CO oxidation test apparatus.

Figure 10:
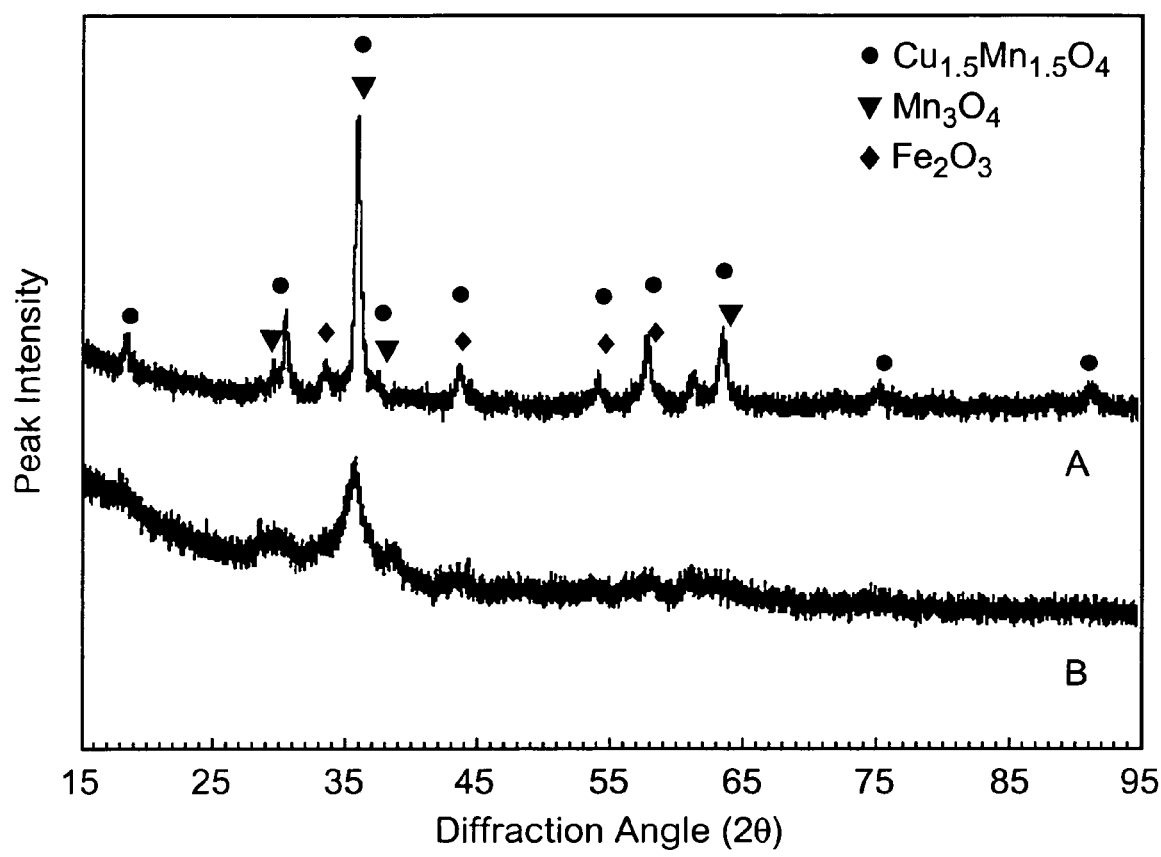

FIG. 10 shows x-ray diffraction data for as-received and calcined spinel ferrite catalyst.

Figure 11:
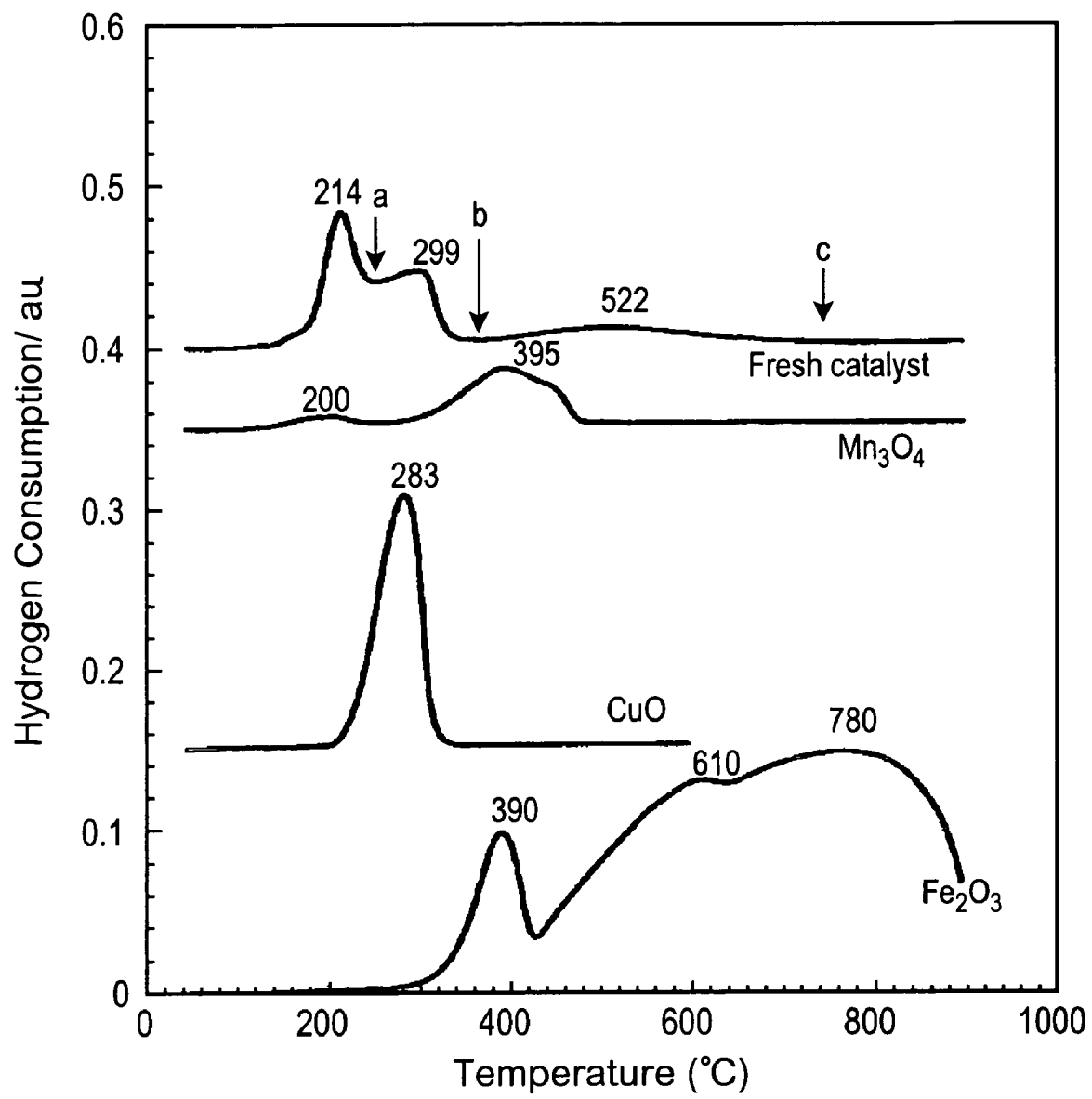

FIG. 11 shows Temperature Programmed Reduction profiles for metal oxides.

Figure 12:
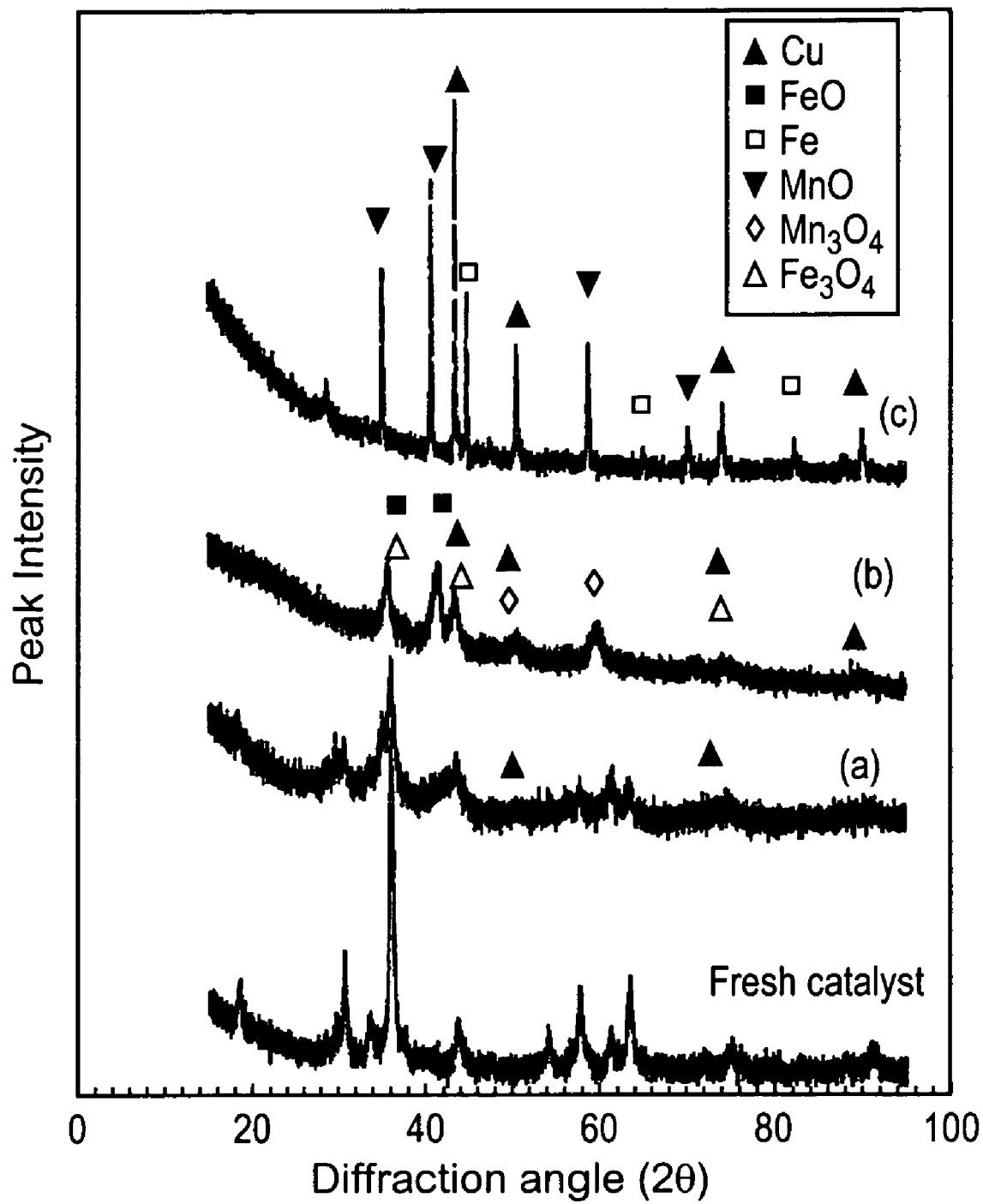

FIG. 12 shows x-ray diffraction data for quenched spinel ferrite catalyst.

Figure 13:
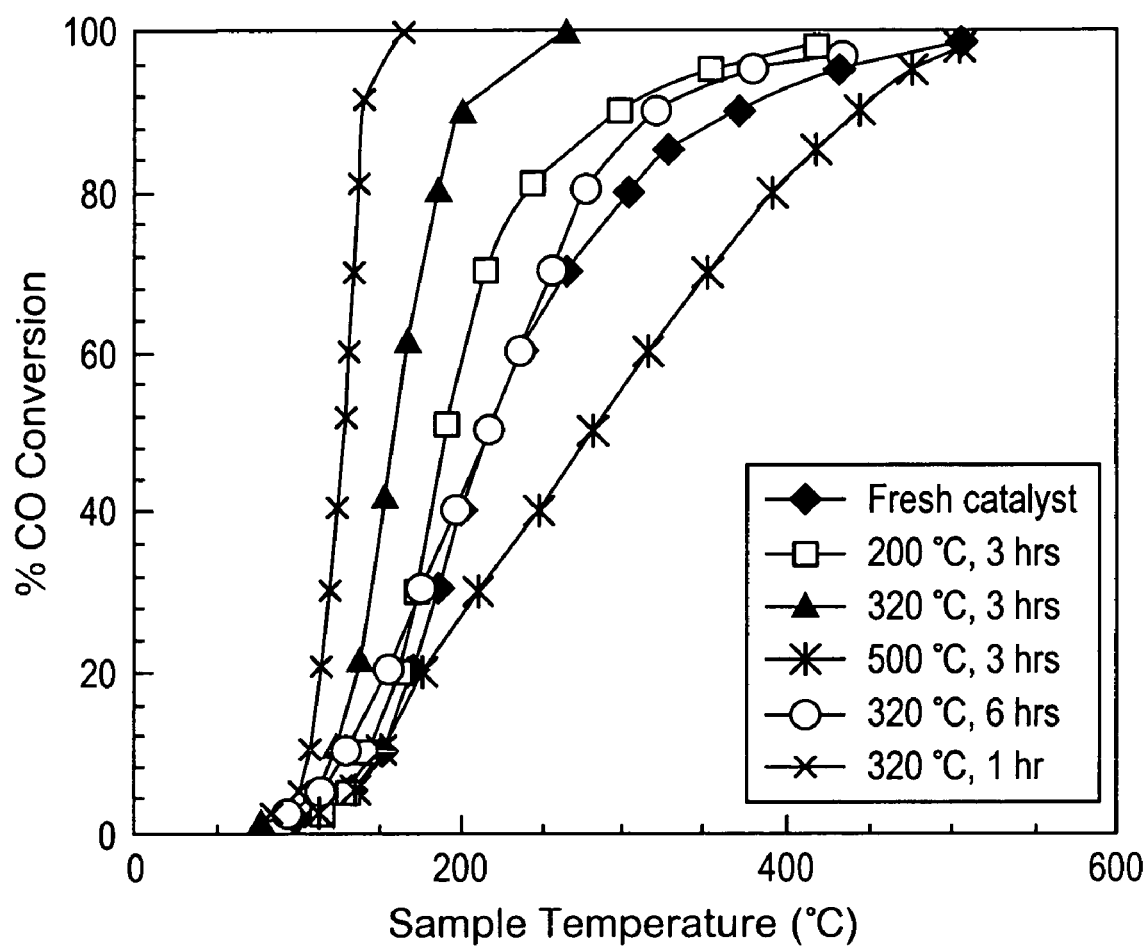

FIG. 13 shows CO conversion efficiency as a function of sample temperatures.

Figure 14:
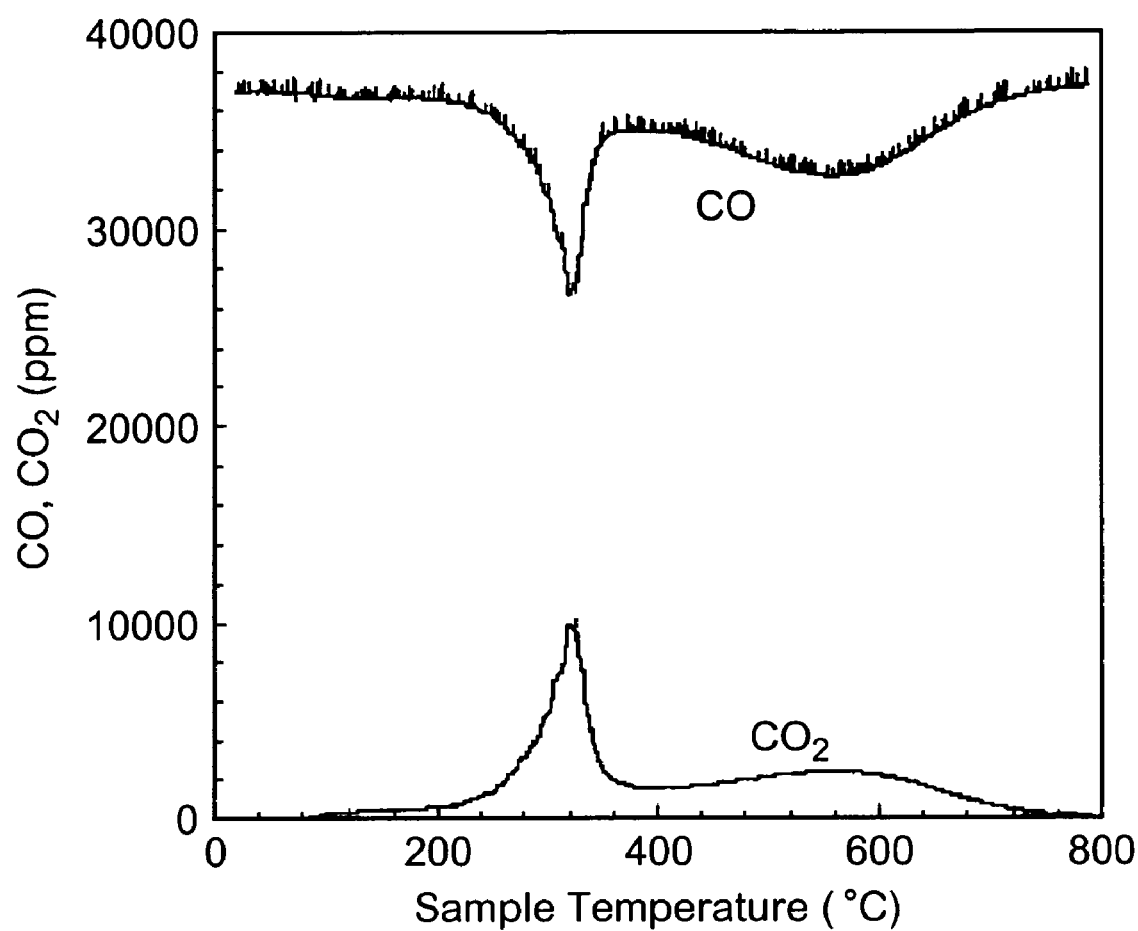

FIG. 14 shows the concentration of CO and $CO_2$ as a function of sample temperature.

DETAILED DESCRIPTION OF THE PREFERRED EMBODIMENTS

Catalytic paper, compositions of catalyst modified web-filler, cigarettes, methods for making smoking articles which involve the use of nanoparticle additives incorporated into the wrapper as web-filler material are capable of acting as an oxidant for the conversion of carbon monoxide to carbon dioxide and/or as a catalyst for the conversion of carbon monoxide to carbon dioxide. The nanoparticle additives reduce the amount of carbon monoxide in mainstream smoke.

The term "mainstream" smoke refers to the mixture of gases passing down the tobacco rod and issuing through the filter end, i.e., the amount of smoke issuing or drawn from the mouth end of a cigarette during smoking of the cigarette. The mainstream smoke contains smoke that is drawn in through both the lighted region, as well as through the cigarette paper wrapper.

Carbon monoxide (CO) oxidation catalysts, such as the nanoparticle spinel ferrite catalysts of the preferred embodiments, can be incorporated into the web-filler material of a wrapper of smoking articles, such as cigarettes and/or into the tobacco cut filler of a smoking article. Such a wrapper is used to assemble the smoking article and is consumed during smoking. While not wishing to be bound by theory, it is believed that during smoking, the incorporated nanoparticle catalyst catalyzes a constituent gas component in the gas stream, e.g., the carbon monoxide catalyst catalyzes CO to reduce the level of CO in the mainstream and sidestream cigarette smoke by reaction with oxygen ($O_2$) in the gas stream of the smoking article to form carbon dioxide ($CO_2$) following equation 1:

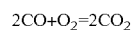

$$2CO + O_2 = 2CO_2 \qquad \text{Eq. 1}$$

It is also believed that subsequent to the catalytic reaction, the catalyst may also act as an oxidant, e.g., can oxidize CO in the absence of oxygen in the gas stream to reduce the level of CO in the mainstream and/or sidestream smoke.

Figures 1A, 1B:
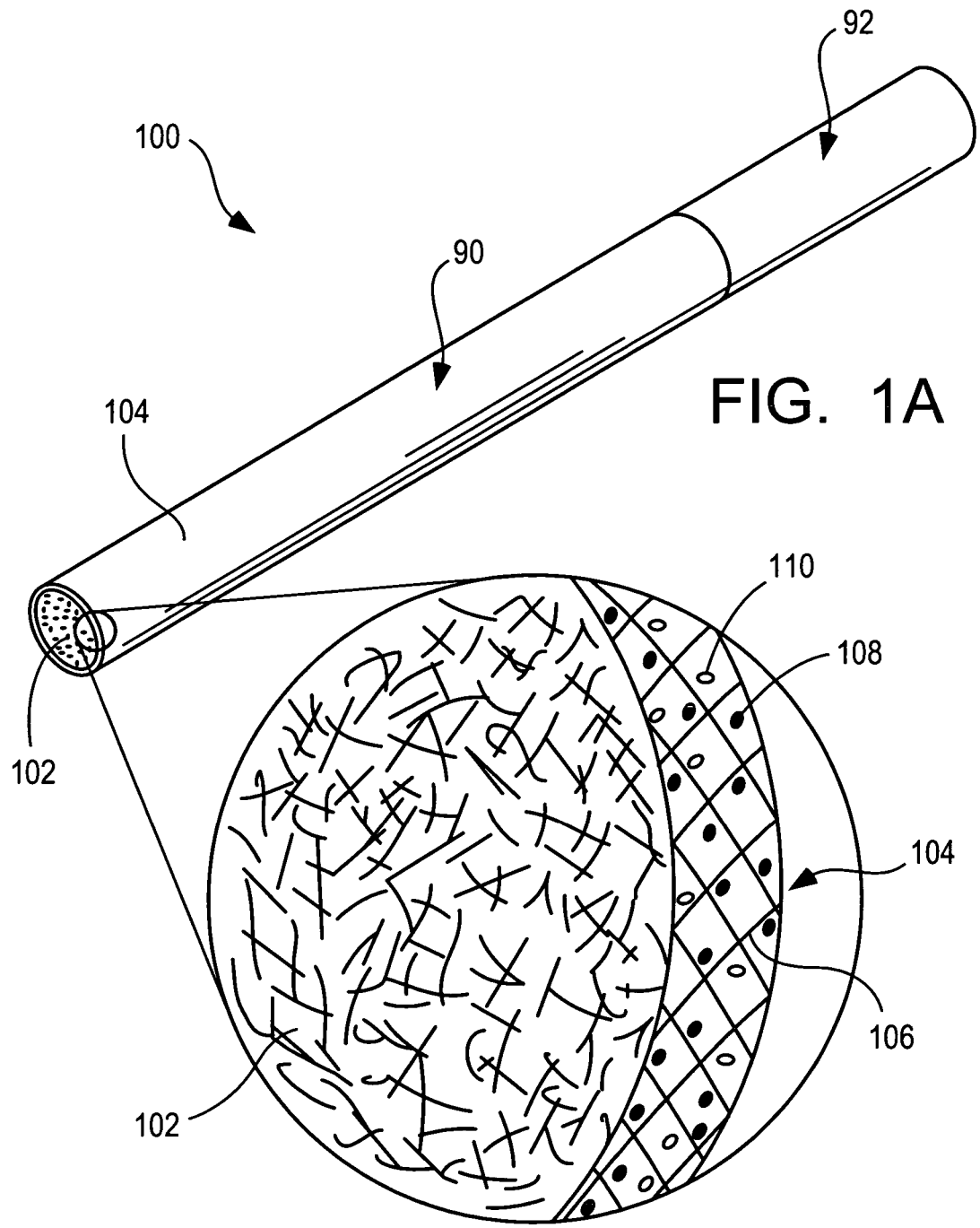
FIG. 1(a) shows an exemplary smoking article with a nanoparticle spinel ferrite catalyst supported on the web-filler material of the wrapper.
FIG. 1(b) shows a magnified view of the wrapper.

Referring to FIG. 1(a), a preferred embodiment of a smoking article 100 has a tobacco rod portion 90 and filtering tip 92. Optionally, embodiments of the smoking article 100 can be practiced without a filtering tip 92. Preferably, the tobacco rod portion 90 comprises a column of tobacco 102 that is enwrapped with a cigarette (tobacco) wrapper 104. As shown in expanded view in FIG. 1(b), the wrapper 104 includes a web of fibrous cellulosic material 106 in which is dispersed particles of web-filler material 108, such as calcium carbonate ($CaCO_3$). In practice, the web-filler material 108 serves as an agent for determining the permeability of the wrapper 104 (measured typically in units of CORESTA, which is defined as the amount of air, measured in cubic centimeters, that passes through one square centimeter of material in one minute at a pressure drop of 1.0 kilopascals) and also serves as a support for nanoparticles of the carbon monoxide catalyst, preferably nanoparticles of a manganese-copper-iron oxide. If desired, the wrapper 104 can optionally include a catalyst-free web-filler material 110. The web-filler material is a filler material utilized in production for the wrapper 104. If desired, the wrapper can optionally include nanoparticles of the carbon monoxide catalyst that are not supported on the web filler material.

Figure 2A:
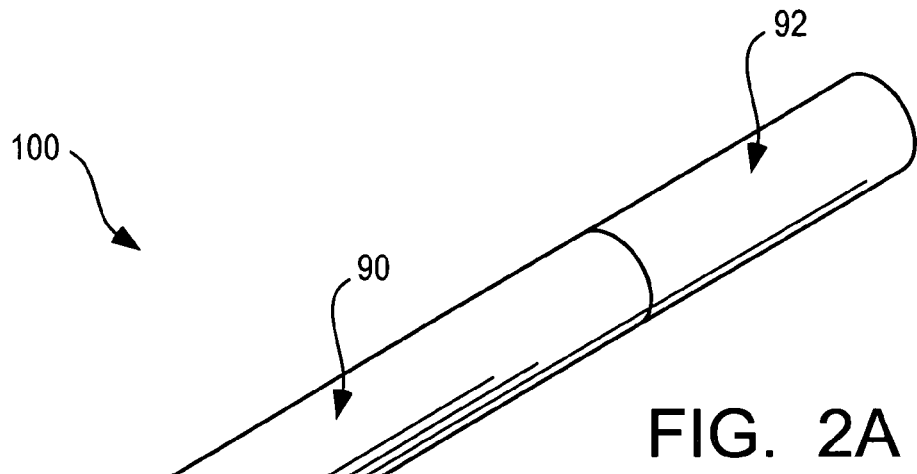
FIG. 2(a) shows an exemplary smoking article with a nanoparticle spinel ferrite catalyst supported on the web-filler material of a first wrapper with a second outermost wrapper.
Figure 2B:
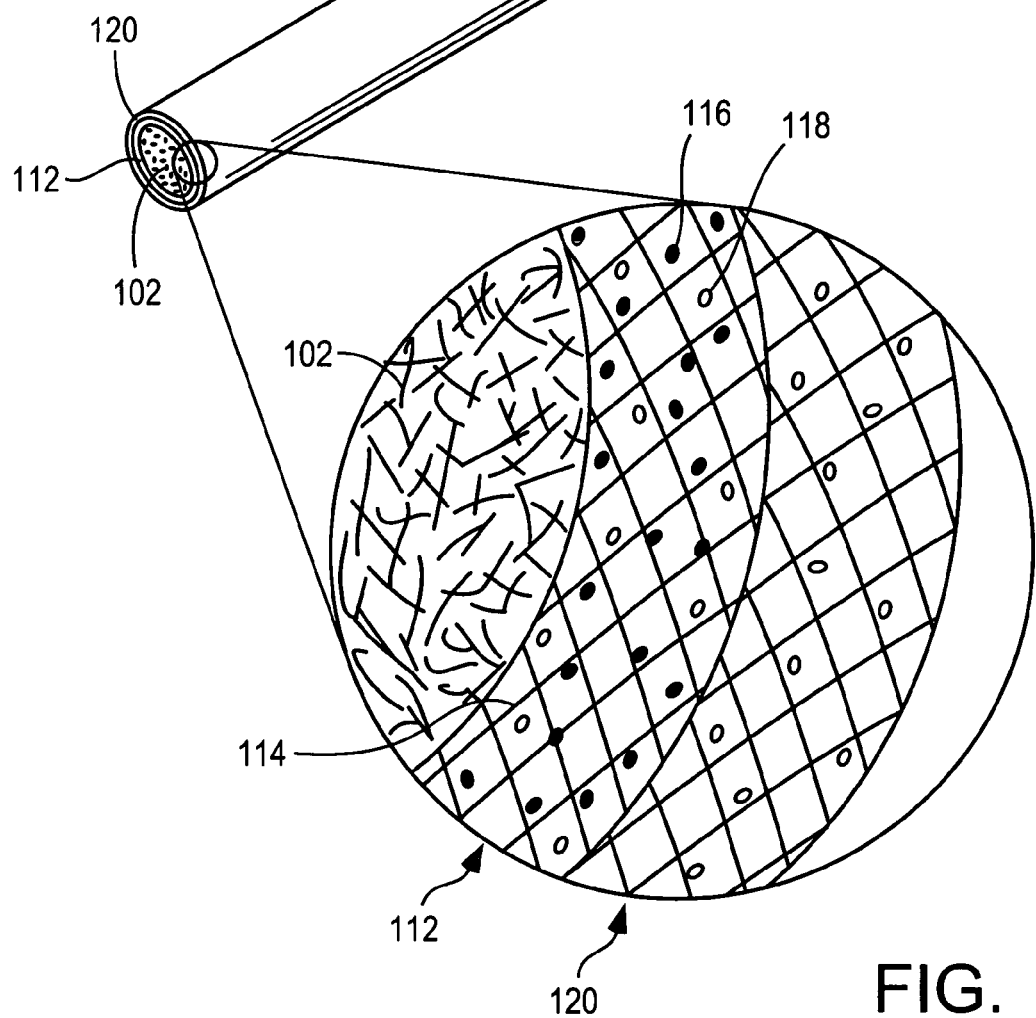
FIG. 2(b) shows a magnified view of the first wrapper with a second outermost wrapper.

FIGS. 2(a) and 2(b) show an embodiment of a smoking article with a nanoparticle spinel ferrite catalyst supported on the web-filler material of a first wrapper with a second outermost wrapper. In the FIG. 2(a) embodiment, the smoking article 100 includes a cigarette tobacco column 102 surrounded by a first inner wrapper 112. As shown in expanded view in FIG. 2(b), the first wrapper 112 includes a web 114 and a nanoparticle spinel ferrite catalyst supported on a web-filler material 116. If desired, the first wrapper 112 can optionally include a catalyst-free web-filler material 118 or an unsupported catalyst material. The web-filler material is a filler material utilized in production of the first wrapper 112. A ratio, in weight percent, of a nanoparticle spinel ferrite catalyst to a web-filler material in the first inner wrapper is preferably from 0.1 to 10.0, more preferably the ratio is 0.1 to 1.0, and most preferably the ratio is 0.33 to 1.0. The smoking article 100 has a second wrapper 120 surrounding the first wrapper 112. The total amount of nanoparticle spinel ferrite catalyst in the second outer wrapper 120 is preferably less than 1 mg for a given single cigarette 100, more preferably the second wrapper 120 does not include the nanoparticle spinel ferrite catalyst so as to provide an appearance to the cigarette 100 that is not affected by any coloration from the nanoparticle catalyst. In exemplary embodiments, a total amount of nanoparticle spinel ferrite catalyst in the first wrapper is 10 to 100 mg and in the second wrapper is less than 1 mg, preferably 0 mg and/or a ratio, in weight percent, of a nanoparticle spinel ferrite catalyst in the second wrapper 120 to the nanoparticle spinel ferrite catalyst in the first wrapper 112 is less than 10. The nanoparticle spinel ferrite catalyst can also be incorporated into the tobacco column 102 (not shown).

FIG. 3(a) shows an embodiment of a smoking article with a wrapper including a nanoparticle spinel ferrite catalyst. In the FIG. 3(a) embodiment, the smoking article 100 includes a cigarette tobacco column 102 and a wrapper 122. As shown in expanded view in FIG. 3(b), the wrapper 122 includes a web 124 and a nanoparticle spinel ferrite catalyst supported on a web-filler material 126. If desired, the wrapper 122 can optionally include a catalyst-free web-filler material 128 or an unsupported catalyst material. The web-filler material is a filler material utilized in production of the wrapper 122. The wrapper 122 has a radially inner portion 130 and a radially outer portion 132, the radially inner portion 130 having a first loading of the nanoparticle spinel ferrite catalyst and the radially outer portion 132 having a second loading of the nanoparticle spinel ferrite catalyst. In one embodiment, the first loading of the nanoparticle spinel ferrite catalyst is greater than the second loading of the nanoparticle spinel ferrite catalyst. For example, the first loading of the nanoparticle spinel ferrite catalyst in the wrapper for a given single cigarette 100 can be up to 100 mg and the second loading of the nanoparticle spinel ferrite catalyst can be less than 1 mg. Preferably the second loading of the nanoparticle spinel ferrite catalyst is zero. In another embodiment, the ratio, in weight percent, of the nanoparticle spinel ferrite catalyst to the web-filler material in the radially inner portion 130 is preferably from 0.1 to 10.0, more preferably from 0.1 to 1.0, most preferably from 0.33 to 1.0. The total loading of the nanoparticle spinel ferrite catalyst in the radially outer portion 132 is preferably less than 1 mg, more preferably zero mg. The catalyst material can also be incorporated into the tobacco column 102 (not shown).

By "nanoparticles" is meant that the particles have an average particle diameter of less than a micron. The nanoparticle catalyst preferably has an average particle size of less than about 500 nm, further preferably less than about 300 to 400 nm, more preferably from 1 to 50 nm, even more preferably 1 to 10 nm, and most preferably less than about 5 nm. A bulk density of the nanoparticle catalyst is preferably less than 0.25 g/cc, preferably about 0.05 g/cc. The Brunauer, Emmett, and Teller (BET) surface area of preferred nanoparticle catalyst is about 10 $m^2/g$ to 50 $m^2/g$, more preferably about 20 $m^2/g$ to about 40 $m^2/g$. An example of a nanoparticle spinel ferrite catalyst includes a nanoparticle manganese-copper-iron oxide catalyst. A preferred nanoparticle manganese-copper-iron oxide catalyst is pigment Black-444, available from Shepherd Color Company. The nanoparticle manganese-copper-iron oxide catalyst can comprise copper manganese spinel ferrite, manganese oxide and iron oxide. The catalyst can comprise natural black iron oxide (natural magnetite) or synthetic black iron oxide in shapes such as cubical, spherical and/or accicular particles.

The nanoparticle spinel ferrite catalyst can be incorporated into the wrapping paper by fixing the nanoparticle spinel ferrite catalyst to filler material utilized as web-filler material in the production of cigarette wrapping paper. The web-filler material can include an oxide, a carbonate, or a hydroxide of a Group II, Group III or Group IV metal, or the web-filler material can be selected from the group consisting of $CaCO_3$, $TiO_2$, silicates such as $SiO_2$, $Al_2O_3$, $MgCO_3$, MgO and $Mg(OH)_2$. In a preferred example, the web-filler material is $CaCO_3$ or other conventional filler material used in cigarette paper manufacture. If desired, the wrapper paper can include web-filler material which does not include the nanoparticle spinel ferrite catalyst or an unsupported catalyst can be incorporated in the cigarette wrapping paper with or without a web-filler such as calcium carbonate.

In a preferred embodiment of a smoking article, the nanoparticle manganese-copper-iron oxide catalyst includes copper manganese spinel ferrite, manganese oxide and iron oxide. The catalyst modified web-filler preferably comprises a nanoparticle manganese-copper-iron oxide catalyst fixed to filler particles selected from the group consisting of $CaCO_3$, $TiO_2$, silicates such as $SiO_2$, $Al_2O_3$, $MgCO_3$, MgO and $Mg(OH)_2$. An average particle size of the catalyst modified paper web-filler is 0.1 to 10 microns, preferably less than or equal to 1.5 microns.

In another preferred embodiment, a total amount of nanoparticle spinel ferrite catalyst in the smoking article is an amount effective to convert at least some CO to $CO_2$. For cigarettes, a preferred amount of catalyst per cigarette is 1 to 100 mg, 1 to 50 mg or 50 to 100 mg, 2 to 25 mg or 25 to 50 mg, 1 to 15 mg or 15 to 40 mg, or 4 to 10 mg or 10 to 20 mg.

In one approach, the nanoparticle spinel ferrite catalyst, such as nanoparticle manganese-copper-iron oxide catalyst, is supported by web-filler material, such as $CaCO_3$, by forming an aqueous slurry of the nanoparticle spinel ferrite catalyst and the web-filler material. The $CaCO_3$ used in this process can be the same as the filler material used in the papermaking process, such as ALBACAR® 5970 commercially available from Specialty Minerals of Bethlehem, Pa. The slurry is spread, by, for example, spreading the slurry with a doctor blade, and then dried to evaporate the water leaving behind a solid. One method to dry the slurry includes exposure in air while heated by a heat source, such as radiation lamp at 75° C., although other methods such as vacuum filtering followed by drying can also be used.

The catalyst and filler can be provided in any desired amounts, e.g., 10 to 90% catalyst and 90 to 10% web-filler material. The dried slurry forms a powdery substance or a self-supporting solid mass, depending on the nanoparticle spinel ferrite catalyst loading of the slurry. For example, for a slurry containing less than about 50 to 60 wt. % catalyst loading of nanoparticle spinel ferrite on calcium carbonate, the slurry dries to a powdery substance; for a slurry containing greater than about 60 to 70 wt. % catalyst loading of the nanoparticle spinel ferrite on calcium carbonate, the slurry dries to a self-supporting solid mass. Prior to incorporating the catalyst modified web-filler into the wrapper, e.g., the web-filler material supporting nanoparticle spinel ferrite catalyst such as nanoparticle manganese-copper-iron oxide catalyst/$CaCO_3$ particles, the average particle size of the catalyst modified web-filler can be reduced to an average particle size of 0.1 to 10 microns, preferably about 1 micron or less. For example, the catalyst modified web-filler can be ball milled to form a powder by milling, for example, with 1 cm agate milling balls for 2 to 4 hours at 100 to 300 rpm. Ball milling may not be necessary where the slurry dries to a powdery substance. Subsequently, the catalyst modified web-filler, e.g., nanoparticle spinel ferrite catalyst/web-filler material, can be incorporated into the wrapper through a paper-making process. For example, the catalyst modified web-filler can be used as filler material in the papermaking processes. In a preferred embodiment, the level of web-filler material in the wrapper (both catalyst modified web-filler and/or web-filler material without catalyst) can be from 3 to 50 wt. %.

In another approach, particles of web-filler material, such as $CaCO_3$, support the nanoparticle spinel ferrite catalyst, such as nanoparticle manganese-copper-iron oxide catalyst, by forming an aqueous slurry of the nanoparticle spinel ferrite catalyst and the web-filler material, drying the slurry to form the catalyst modified web-filler, and subsequently calcining the catalyst modified web-filler. The slurry is formed substantially as described above with respect to the first approach. After drying the slurry to form a self-supporting solid mass and ball milling to form a powder (if necessary to reduce the size of the catalyst modified web-filler), the catalyst modified web-filler is calcined by heating the catalyst modified web-filler to a suitable calcining temperature, e.g., up to 500° C., preferably from 200° C. to 400° C., for a suitable period of time such as from 1 to 3 hours, preferably 2 hours.

The nanoparticle spinel ferrite catalyst can be fixed to the web-filler material by any suitable technique. For example, the nanoparticle spinel ferrite catalyst can be combined with the web-filler material by precipitating the catalyst from a liquid phase onto the web-filler material or depositing the catalyst from a vapor phase onto the web-filler material.

According to a preferred embodiment, the catalyst or catalyst modified web-filler, e.g., the nanoparticle spinel ferrite catalyst/web-filler material, is incorporated in the wrapper through conventional papermaking processes. For example, the catalyst modified web-filler or spinel ferrite catalyst can be used as all or part of the filler material in the papermaking processes or can be distributed directly onto the wrapper, such as by spraying or coating onto wet or dry base web. In production of a smoking article such as a cigarette, the wrapper is wrapped around cut filler to form a tobacco rod portion of the smoking article by a cigarette making machine, which has previously been supplied or is continuously supplied with tobacco cut filler and one or more ribbons of wrapper. In a further embodiment, the catalyst can be incorporated in the tobacco cut filler.

Any suitable tobacco mixture may be used for the cut filler. Examples of suitable types of tobacco materials include flue-cured, Burley, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

A wrapper can be any wrapping surrounding the cut filler, including wrappers containing flax, hemp, kenaf, esparto grass, rice straw, cellulose and so forth. Optional filler materials, flavor additives, and burning additives can be included. When supplied to the cigarette making machine, the wrapper can be supplied from a single bobbin in a continuous sheet (a monowrap) or from multiple bobbins (a multiwrap, such as a dual wrap from two bobbins). Further, the wrapper can have more than one layer in cross-section, such as in a bilayer paper as disclosed in commonly-owned U.S. Pat. No. 5,143,098, issued to Rogers, the entire content of which is herein incorporated by reference.

The papermaking process can be carried out using conventional paper making equipment. An exemplary method of manufacturing paper wrapper, e.g., cigarette paper including catalyst modified web-filler comprising nanoparticle spinel ferrite catalyst supported by a web-filler material, comprises supplying the catalyst modified web-filler and a cellulosic material to a papermaking machine. For example, an aqueous slurry (or "furnish") including the catalyst modified web-filler and the cellulosic material can be supplied to a head box of a forming section of a Fourdrinier papermaking machine. The catalyst modified web-filler includes a nanoparticle spinel ferrite catalyst, e.g., nanoparticle manganese-copper-iron oxide catalyst, supported by a web-filler material, e.g., $CaCO_3$. For example, the catalyst modified web-filler can include nanoparticle manganese-copper-iron oxide catalyst/$CaCO_3$ particles or any other suitable nanoparticle spinel ferrite catalyst and web-filler material, such as an oxide, a carbonate, or a hydroxide of a Group II, Group III or Group IV metal, $CaCO_3$, $TiO_2$, silicates such as $SiO_2$, $Al_2O_3$, $MgCO_3$, $MgO$ and $Mg(OH)_2$. The aqueous slurry can be supplied to the head box by a plurality of conduits which communicate with a source, such as a storage tank.

The exemplary method can optionally include calcining the catalyst modified web-filler in a step prior to supplying the furnish to the papermaking machine.

The catalyst modified web-filler can be supplied to the papermaking process in any suitable form, such as in the form of an aqueous slurry or in the form of a dry powder to be slurried during the papermaking process prior to addition to the head box. For example, the catalyst modified web-filler can be produced on site as a slurry. The aqueous slurry containing the catalyst modified web-filler can be used immediately or stored for future use. In a preferred embodiment, the head box is supplied with an aqueous slurry of furnish containing the catalyst modified web-filler and cellulosic material used to form a web. Optionally, an aqueous slurry of furnish containing catalyst modified web-filler and an aqueous slurry furnish of cellulosic material without catalyst modified web-filler or with a different concentration of catalyst modified web-filler can be supplied to separate head boxes or multiple head boxes.

An exemplary method deposits the aqueous slurry from the head box onto a forming section so as to form a base web of the cellulosic material and the catalyst modified web-filler. For example, in a typical Fourdrinier machine, the forming section is a Fourdrinier wire which is arranged as an endless forming wire immediately below the head box. A slice defined in a lower portion of the head box adjacent to the endless wire permits the aqueous slurry of catalyst modified web-filler and cellulosic material from the head box to flow through the slice onto the top surface of the endless wire to form a wet base web. Optionally, the aqueous slurry can be deposited onto a support web that is retained within the paper. For example, a support web can be transported through the forming section of a papermaking machine and can be a foundation on which the aqueous slurry is deposited. The aqueous slurry dries on the Fourdrinier wire in the forming section to an intermediate web, which may still retain an aqueous component, and is further processed to form a paper sheet (e.g., finished web) with the support web embedded therein. The support web can be a conventional web, such as a flax support web, or can include a web with an incorporated catalytic component, such as a nanoparticle spinel ferrite catalyst. If the support web includes a catalytic component, the incorporated catalytic component can be supported on a web-filler material or can be directly supported on the support web without a web-filler material.

After depositing the aqueous slurry onto the forming section, water is removed from the wet base web to form an intermediate web and, with additional processing such as further drying and pressing if necessary, forms a sheet of cigarette paper (e.g., finished web). The cigarette paper is subsequently taken up for storage or use, e.g., the cigarette paper is coiled in a sheet or roll.

Referring to FIG. 4, a cigarette papermaking machine 200 includes a head box 202 operatively located at one end of a Fourdrinier wire 204, and source of feed stock slurry such as a run tank 206 in communication with the head box 202. The head box 202 can be one typically utilized in the papermaking industry for laying down cellulosic pulp upon the Fourdrinier wire 204. In the usual context, the head box 202 is communicated to the run tank 206 through a plurality of conduits. The run tank 206 receives furnish from a furnish supply 218. Preferably, the feed stock from the run tank 206 is a refined cellulosic pulp such as a refined flax or wood pulp as is the common practice in the cigarette papermaking industry. Preferably, a chalk tank 228 (containing the catalyst modified web-filler described above) is communicated with the run tank 206 so as to establish a desired "chalk" level in the slurry supplied to the head box 202.

The Fourdrinier wire 204 carries the laid slurry pulp (e.g., base web) from the head box 202 along a path in the general direction of arrow A in FIG. 4, whereupon water is allowed to drain from the pulp through the wire 204 by the influence of gravity and (optionally) at some locations with the assistance of vacuum boxes 210, 210', 210'' at various locations along the Fourdrinier wire 204 as is the established practice in the art of cigarette papermaking. At some point along the Fourdrinier wire 204, sufficient water is removed from the base web to establish what is commonly referred to as a dry line where the texture of the slurry transforms from one of a glossy, watery appearance to a surface appearance more approximating that of the finished base web (but in a wetted condition, e.g., an intermediate web). At and about the dry line, the moisture content of the pulp material is approximately 85 to 90%, which may vary depending upon operating conditions and the like.

Downstream of the dry line, the intermediate web 212 is separated from the Fourdrinier wire 204 at a couch roll 214. From there, the Fourdrinier wire 204 continues on the return loop of its endless path. Beyond the couch roll 214, the intermediate web 212 continues on through the remainder of the papermaking system which further dries and presses the intermediate web 212 and surface conditions the intermediate web 212 to a desired final moisture content and texture to form a paper 220 (e.g., finished web). Such drying apparatus are well known in the art of papermaking and may include drying section 216 including drying felts, vacuum devices, rolls and/or presses, applied thermal energy, and the like.

The cigarette making machine 200 can optionally include more than one head box and/or more than one Fourdrinier wire with either separate or common furnish supply. Referring to FIG. 4, the optional second head box 202', suitably integrated with a runtank and furnish supply, can lay slurry pulp onto the slurry pulp laid from the first head box 202 and carried along Fourdrinier wire 204. The second and/or additional head box can be supplied with catalyst modified web filler to a desired "chalk" level or can be free of catalyst modified web-filler, as desired based on the number of layers of slurry pulp to be deposited and/or the use of the wrapper formed from the papermaking process. Optionally and/or in the alternative, some or all of the catalyst modified web-filler may be introduced from the first, upstream head box 202.

Referring to FIG. 4, the optional second Fourdrinier wire 204', suitably integrated with a head box 202' laying slurry pulp on the Fourdrinier wire 204' and draining and drying equipment, can form a second intermediate web 212'. The second intermediate web 212' can be separated from the second Fourdrinier wire 204' at a second couch roll 214' and laid on the first intermediate web 212 from the Fourdrinier wire 204 to be processed into double layer paper. Multiple optional Fourdrinier wires can be employed to form multiple layer paper having any desired number of layers, such as three, four and so forth, up to ten to twelve layers.

Other papermaking processes can be used to make a wrapper with a nanoparticle spinel ferrite catalyst. For example, a laminated, bilayer or multilayer wrapper can be made. Examples of bilayer and multilayer wrappers are disclosed in commonly-owned U.S. Pat. No. 5,143,098, issued to Rogers. In an embodiment of a bilayer or multilayer wrapper including a nanoparticle spinel ferrite catalyst, at least one of a radially inner layer and/or a radially outer layer can include the nanoparticle spinel ferrite catalyst as described in embodiments herein. Preferably, for cosmetic appearance due to darkening of paper containing catalyst modified web-filler with a spinel ferrite as the nanoparticle catalyst, a radially innermost layer of the multilayer paper adjacent the cut filler in the smoking article is the portion of the multilayer wrapper that includes the web-filler material that supports a nanoparticle spinel ferrite catalyst.

The bilayer or multilayer single sheet wrapper may be made using ordinary paper furnish such as pulped wood, flax fibers, or any standard cellulosic fiber. Preferably flax fibers are used. Different fillers, including different catalytic fillers such as the catalyst modified web-filler described herein, or different fibers may be used for each layer and may be contained in different head boxes, as disclosed in U.S. Pat. No. 5,143,098. For example, a first head box can hold the materials for a wrapper that includes the nanoparticle spinel ferrite catalyst and a second head box can hold the materials for a conventional wrapper.

In another example of making bilayer or multilayer single sheet wrapper, the first head box can hold the materials for a wrapper that includes the nanoparticle spinel ferrite catalyst at a first concentration or loading level and a second head box can hold the materials for a wrapper that includes the nanoparticle spinel ferrite catalyst at a second concentration or loading level. In preferred embodiments, the first concentration or first loading level is different from the second concentration or second loading level. For example, the wrapper can have a radially inner layer and a radially outer layer, the radially inner layer having a first loading of the nanoparticle spinel ferrite catalyst and the radially outer layer having a second loading of the nanoparticle spinel ferrite catalyst. The first loading of the nanoparticle spinel ferrite catalyst can be greater than the second loading of the nanoparticle spinel ferrite catalyst. In one embodiment, the first loading of the nanoparticle spinel ferrite catalyst is up to 100 mg and the second loading of the nanoparticle spinel ferrite catalyst is less than 1 mg. Preferably, the second loading of the nanoparticle spinel ferrite catalyst is zero. In another embodiment a ratio, in weight percent, of the nanoparticle spinel ferrite catalyst to the web-filler material in the radially inner layer is from 0.1 to 10.0, more preferably from 0.1 to 1.0, most preferably from 0.33 to 1.0, and a total loading of the nanoparticle spinel ferrite catalyst in the radially outer layer is less than 1 mg, more preferably the total loading of the nanoparticle spinel ferrite catalyst in the radially outer layer is zero.

Additional examples of papermaking processes include the method for making banded smoking article wrappers disclosed in commonly-owned U.S. Pat. No. 5,342,484, the entire content of which is herein incorporated by reference, and the method for producing paper having a plurality of regions of variable basis weight in the cross direction disclosed in commonly-owned U.S. Pat. Nos. 5,474,095 and 5,997,691, the entire contents of which are herein incorporated by reference. Further and in the alternative to incorporating nanoparticle catalyst into the web of the wrapper in a papermaking process, it is contemplated that the paper (wrapper) can be manufactured first and the nanoparticle catalyst placed onto the surface. For example, the nanoparticles can be distributed directly onto the wrapper, such as by spraying or coating onto wet base web, the intermediate web or the finished web. Further, the nanoparticle can be coated and/or printed (text or images) within the papermaking process or in a separate application of nanoparticle catalyst on-line during manufacture of the cigarette. The amount of printing and/or the amount of catalyst can be varied to adjust the level of CO reduction. The use of retention aids is also contemplated.

The catalyst-containing paper can be used as a wrapper for conventional cigarettes or non-conventional cigarettes such as cigarettes for electrical smoking systems described in commonly-assigned U.S. Pat. Nos. 6,026,820; 5,988,176; 5,915,387; 5,692,526; 5,692,525; 5,666,976; 5,499,636 and 5,388,594 or non-traditional types of cigarettes having a fuel rod such as are described in commonly-assigned U.S. Pat. No. 5,345,951.

FIG. 5 illustrates one type of construction of a cigarette 300, which can be used with an electrical smoking device. As shown, the cigarette 300 includes a tobacco rod 360 and a filter portion 362 joined by tipping paper 364. The filter portion 362 preferably contains a tubular free-flow filter element 302 and a mouthpiece filter plug 304. The free-flow filter element 302 and mouthpiece filter plug 304 may be joined together as a combined plug 310 with plug wrap 312. The tobacco rod 360 can have various forms incorporating one or more of the following items: an overwrap 371, another tubular free-flow filter element 374, a cylindrical tobacco plug 380 preferably wrapped in a plug wrap 384, a tobacco web 366 comprising a base web 368, and a void space 391. The catalyst modified web-filler is preferably incorporated into the overwrap 371, but in addition or in the alternative, could be incorporated into any one or more of the plug wrap 384 or a component or components of the tobacco web 366, preferably the based web 368 thereof.

FIG. 6 illustrates a cigarette 410 construction having a fuel element 411 as described in U.S. Pat. No. 5,345,951, the disclosure of which is hereby incorporated by reference. The cigarette 410 includes the fuel element 411 and an expansion tube 412 overwrapped by cigarette wrapping paper 414, and a filter element 413 attached by tipping paper 405. With reference to FIG. 7, the fuel element 411 includes a heat source 420 and a flavor bed 421 which releases flavored vapors and gases when contacted by hot gases flowing through one or more longitudinal passages in the heat source. The vapors pass into the expansion chamber 412 and then to mouthpiece element 413. The heat source may contain pure substantially carbon and optionally catalysts or burn additives. One or more layers of catalyst modified paper 418 surrounding the heat source 420 can be used to reduce CO produced by the heat source 420. Alternatively, or in addition thereto, catalyst modified paper can be provided downstream of the heat source 420, e.g., catalyst modified paper can be dispersed between the heat source and the flavor bed 421 or in the flavor bed 421. Flavor bed 421 can include any material that releases desirable flavors, e.g., tobacco filler or inert substrate on which flavor forming compounds have been deposited.

The fuel element 411 is housed in a composite sleeve having a radiant energy reflector sleeve 422 (e.g., perforated metallized paper) and optional inner sleeve 423 (e.g., perforated metallized paper). The inner sleeve 422 can be folded in to form a lip 424 at the upstream end thereof to hold the heat source suspended away from the interior wall of the reflector sleeve 422 with an annular space therebetween. Flavor bed 421 is held within inner sleeve 423. The wrapper 414 which holds the fuel element and expansion chamber 412 together preferably has sufficient porosity to allow air to be admitted through the paper 414 and support combustion of the heat source. The fuel element 411 also includes a reflective end cap 415 with one or more openings 416 to allow air into the fuel element 411. Methods to make smoking articles can include dual paper wrappers, e.g., an inner wrapper and an outer wrapper. If desired, the catalyst modified paper can be used at other locations and/or for any of the paper layers of the cigarette shown in FIGS. 6 and 7. Further, while one embodiment of a fuel element cigarette is shown in FIGS. 6 and 7, the catalyst modified paper disclosed herein can be used to surround the fuel element and/or in place of paper layers in other fuel element cigarette arrangements than shown in FIGS. 6 and 7.

FIG. 8 illustrates a cigarette 500 having a concentric tobacco rod 510 that includes an inner tube or sheath of cigarette wrapper 515 whose web-filler material supports a nanoparticle spinel ferrite catalyst, such as an manganese-copper-iron oxide and/or any other oxidation catalyst described herein. As shown, the cigarette 500 comprises a filter 505 and a tobacco rod 510 which are attached to one another with tipping paper 511 in a conventional fashion. The tobacco rod 510 is a "iconcentric core" or "coaxial" layout that can be produced on a Hauni Baby rod making machine available from Hauni Machinenbau AG of Hamburg, Germany. An inner core region 512 is defined by the inner wrapper 515, which is surrounded by tobacco cut filler material 520. An outer cigarette wrapper 525 extends along the outside of the tobacco rod 510. The filter 505 can comprise one or more plugs of cellulose tow and optionally could include an adsorbent such as carbon. In this embodiment, any coloration in the inner wrapper 515 is hidden from view.

The central core region 512 can be hollow and/or can be partially or wholly filled with tobacco cut filler and is preferably approximately 2-5 mm in diameter, more preferably 2-3 mm in diameter. In one alternative, the inner wrapper 515 can be constructed in a layered arrangement with at least one of the layers formed of catalytic paper wherein a nanoparticle catalyst, such as nanoparticle manganese-copper-iron oxide, is supported on a web-filler material, such a $CaCO_3$. Optionally, the outer wrapper 525 may be constructed similarly to include a nanocatalyst.

Optionally, the central tube can be constructed such that heat applied to an end of the tube will cause the end portion of the tube to collapse upon itself and seal off (or close) the end of the tube. The collapsing feature can be achieved by a number of different embodiments of the central tube. In an alternative where the central tube collapses when heat is applied, the central tube 515 can be constructed in a layer arrangement such that an outer or top layer is made from a material having a higher thermal expansion coefficient than an inner or bottom layer. As a result, when the end of the tube is heated, the difference in thermal expansion coefficient between the two layers will result in the end portion of the tube collapsing upon itself and, optionally, sealing off the end. The layers of the central tube 515 can be constructed from different types of paper having the different thermal expansion coefficients. The difference in thermal expansion coefficients of the layers can be a result of the types of paper having different proportions of cellulose and/or different binders. One or more of the different types of paper can be a catalytic paper wherein a nanoparticle catalyst, such as nanoparticle manganese-copper-iron oxide, is supported on a web-filler material, such as $CaCO_3$. Alternatively, other polymeric, starch or cellulosic based films can be used for the central tube 515, anyone of which can include the catalyst modified web-filler.

If desired, the catalytic paper can be used at other locations and/or for any of the paper layers of the cigarette shown in FIG. 8. Further, while one embodiment of a cigarette with a porous heat transfer tube is shown in FIG. 8, the catalytic paper disclosed herein can be used to surround the tobacco rod portion, or can be used as the wrapper, be incorporated into a cellulosic component of the filter portion, and/or in place of paper layers in other porous heat transfer tube cigarette arrangements than shown in FIG. 8.

Referring now to the embodiment of FIGS. 2(a) and 2(b), the inner wrapper and the outer wrapper are individual wrappers formed in separate papermaking processes and later wrapped around tobacco cut filler to from a cigarette tobacco rod. The inner wrapper, the outer wrapper or both wrappers can include the catalyst modified web-filler, e.g., the nanoparticle spinel ferrite catalyst supported by a web-filler material. In examples where both wrappers include a catalyst modified web-filler, the specific nanoparticle spinel ferrite catalyst and the catalyst loading in each wrapper can be the same or different. In some embodiments, the addition of a catalyst modified web-filler can discolor the wrapper, e.g., the wrapper becomes non-white or brown. For aesthetic reasons, an outer wrapper that is a conventional color, e.g., white, can be placed around the inner wrapper. Both the inner wrapper and the outer wrapper can be selected to give a desired smoking article performance with respect to smoking article properties, such as puff count, tar, burn rate, and ash appearance. Accordingly and as shown and described, for example, with reference to FIGS. 2(a) and 2(b), preferred embodiments of smoking articles and methods of making smoking articles can include a tobacco rod portion of a cigarette with a nanoparticle spinel ferrite catalyst supported on the web-filler material of a first wrapper with a second outermost wrapper, which does not contain the catalyst modified web-filler. Also with reference to FIG. 8, the central tube formed with catalytic paper can satisfy aesthetics by placing the catalytic paper in the interior of the smoking article.

An exemplary wrapper for a smoking article comprises a paper web including cellulosic fibers and a catalyst modified web-filler incorporated into the paper web. The catalyst modified web-filler includes a web-filler material supporting a nanoparticle spinel ferrite catalyst or the spinel ferrite catalyst can be used as the web-filler.

The wrapper can be any suitable conventional wrapper. For example, a preferred wrapper can have a basis weight of from about 18 $g/m^2$ to about 60 $g/m^2$ and a permeability of from about 5 CORESTA units to about 80 CORESTA units. More preferably, the wrapper has a basis weight from about 30 $g/m^2$ to about 45 $g/m^2$ and the permeability is about 30 to 35 CORESTA units. However, any suitable basis weight for the wrapper can be selected. For example, a higher basis weight, e.g., 35 to 45 $g/m^2$, can support a higher loading of catalyst. If a lower catalyst loading is selected, then a lower basis weight wrapper can be used.

Other permeabilities of the wrapper (as measured by CORESTA units) can be selected based on the application and location of the wrapper. For example, in multilayer wrappers the permeability of a first layer can be up to 30,000 CORESTA units, although a permeability that is lower or higher can be utilized. Thickness of single-layer wrapper can preferably be from 15 to 100 microns, more preferably from 20 to 50 microns. Additional layers in a multilayer wrapper can be from 0.1 to 10 times the permeability of the first layer and can have a thickness of from 0.1 to 2 times the thickness of the first layer. Both the permeability and the thickness of the first layer and the second layer can be selected to achieve a desired total air permeability and total thickness for the smoking article.

The nanoparticle spinel ferrite catalyst to web-filler material ratio can be varied by subjecting a slurry of nanoparticle spinel ferrite catalyst/web-filler material, e.g., a slurry of nanoparticle manganese-copper-iron oxide catalyst/$CaCO_3$ or other catalyst modified web-filler, to calcining at different temperatures for different time periods. Also, the mixing conditions of the slurry can be selected to achieve a desired distribution of the web-filler material with the nanoparticle spinel ferrite catalyst. For example, the speed, time, blade type, and temperature can all be adjusted to achieve a desired uniformity of the nanoparticle spinel ferrite catalyst to web-filler material ratio. Alternatively, the nanoparticle spinel ferrite catalyst/web-filler material can be co-precipitated to form a particle or a powder, e.g., chemical precipitation methods can be used, such as precipitating $CaCO_3$ from $CaCl_3$ by adding a carbonate, such as $Na_2CO_3$. Gas phase precipitation methods to deposit nanoparticle spinel ferrite catalyst in-situ onto a web-filler material can also be employed. For example, vapor deposition or spray techniques can be used.

While not wishing to be bound by theory, it appears that CO catalyst in the form of nanoparticle spinel ferrite catalyst, starts to convert CO to $CO_2$ at a temperature above about 110° C. Additionally, the conversion rate of CO to $CO_2$ by nanoparticle spinel ferrite catalyst is enhanced by the rapid and efficient transport of CO to the region of the nanoparticle spinel ferrite catalyst and $CO_2$ away from the region of the catalyst, e.g., air flow within the smoking article. Together, the operating temperature and the air flow within the smoking article can affect the operation of the nanoparticle spinel ferrite catalyst.

During the puffing process, CO in mainstream smoke flows toward the filter end of a smoking article. As carbon monoxide travels within the smoking article, oxygen diffuses into and carbon monoxide diffuses out of the smoking article through the paper wrapper. After a typical 2-second puff of a cigarette, CO is concentrated in the periphery of the cigarette, e.g., near the cigarette wrapper, in front of the burn zone. The oxygen concentration is high in the same region as high CO concentration due to diffusion of $O_2$ from outside the cigarette. Airflow into the tobacco rod is largest near the burn zone on the periphery of the smoking article and is approximately commensurate with the gradient of temperature, e.g., larger airflow is associated with higher temperature gradients. Thus, the highest airflow is also the region of highest temperature gradient. For example in a typical smoking article, the highest temperature gradient is from >850-900° C. at the periphery of the smoking article at the burn zone to approximately 300° C. toward the center of the smoking article. The temperature further drops to near ambient near the filter end. Furthermore, the temperature drop at the lit end is very fast and within a couple of mm behind the burn zone in the axial direction the temperature drops from 900° C. to 200° C. Further information on airflow patterns, the formation of constituents in cigarettes during smoking and smoke formation and delivery can be found in Richard R. Baker, "Mechanism of Smoke Formation and Delivery", *Recent Advances in Tobacco Science*, vol. 6, pp. 184-224, (1980) and Richard R. Baker, "Variation of the Gas Formation Regions within a Cigarette Combustion Coal during the Smoking Cycle", *Beiträge zur Tabakforschung International*, vol. 11, no. 1, pp. 1-17, (1981), the contents of both are incorporated herein by reference.

The position and quantity of nanoparticle spinel ferrite catalyst in the wrapper and/or tobacco rod can be selected as a function of the temperature and airflow characteristics exhibited in a burning cigarette in order to adjust, e.g., increase, decrease, minimize or maximize, the conversion rate of CO to $CO_2$, by depositing aqueous slurry with catalyst modified web-filler selectively during the papermaking process. For example, the solid coal in a smoking article reaches the peak temperature of greater than 850-900° C. at about the burn zone, e.g., within about 2 mm of the burn zone, and is at 300° C. to 400° C. within 2 to 3 mm of the burn zone. Thus, a nanoparticle spinel ferrite catalyst can be selected that operates in a given temperature range, and a wrapper can be manufactured in which the catalyst modified web-filler, e.g., nanoparticle manganese-copper-iron oxide catalyst/$CaCO_3$, can be incorporated in those portions of the wrapper that are predicted to coincide with the appropriate temperature for operation of the catalyst. The selective incorporation of catalyst modified web-filler can be realized, for example, by using different head boxes containing the selected concentration of catalyst modified web-filler and/or locating head boxes with different concentrations of catalyst modified web-filler at selected positions in the papermaking process corresponding to selected locations of the catalytic paper to be produced.

For example, a preferred nanoparticle spinel ferrite catalyst for use in a wrapper for a smoking article is catalytically active at temperatures as low as ambient temperature and preferably does not deactivate even at temperatures as high as 900° C. The preferred nanoparticle spinel ferrite catalyst can be positioned along the entire axial length of the anticipated burn zone, e.g., not only at the filter end of the smoking article, and can be catalytically active from the lit end to the filter end during use. The axial distribution of the nanoparticle spinel ferrite catalyst provides sufficient contact time between the mainstream smoke and the nanoparticle spinel ferrite catalyst for the CO to be converted to $CO_2$. An example of a preferred nanoparticle spinel ferrite catalyst includes Black-444, which starts to convert CO to $CO_2$ at a temperature above about 110° C.

In a further example, a mixed catalyst, e.g., a catalyst that is a combination of individual catalyst compositions that each operate at a different temperature range or overlapping temperature ranges, can be used to broaden the temperature range at which conversion of CO to $CO_2$ can occur and to increase the operating period of the catalyst as the smoking article burns. For example, a mixed catalyst may operate at both above about 500° C. and at 300° C. to 400° C. and thus converts CO to $CO_2$ both at the burn zone and behind the burn zone, effectively increasing the conversion time and the area of the wrapper at which conversion occurs.

Although the catalyst is described herein as having an operating temperature, the term operating temperature refers to the preferred temperature for conversion of CO to $CO_2$. The catalyst may still operate to convert CO to $CO_2$ outside the described temperature range, but the conversion rate may affected.

A horizontal flow tube set-up as illustrated in FIG. 9 can be used to evaluate the CO oxidation efficacy of as-received nanoparticle spinel ferrite catalyst as well as heat treated (i.e., calcined) samples. A catalyst bed 3 containing about 100 mg of nanoparticles can be placed between two pieces of quartz wool 4 at the center of a 6 mm I.D. quartz tube 2. The quartz tube can be heated in a horizontal tube furnace 6 at a heating rate of from about 1 to 50° C./min (e.g., 6, 10 or 20° C./min) and the temperature of the catalyst can be measured using a thermocouple 5. A CO gas mixture (e.g., a CO—$O_2$—He mixture) can be introduced to the quartz tube 4 via gas flow inlet 1 and the composition of the effluent gases can be analyzed by an infra red detector 7.

A calcination process was investigated for heat treating the nanoparticle spinel ferrite. A reduction followed by oxidation type of heat treatment can be applied to as-received spinel ferrite nanoparticles. The calcination can comprise a reduction step under a 3.7% CO—He gas flow (e.g., 300 sccm) for one hour at 400° C.; a cooling step under pure He where the sample is cooled to ambient temperature; and an oxidation step under a 20% $O_2$—He flow (e.g., 300 sccm) for from 1 to 6 hours at different temperatures (e.g., 200, 320 or 500° C.). Without being held to any one theory, it is believed that a calcination step can improve the bonding between the catalyst and the web-filler material and that during the calcination step the catalyst surface is improved due to evaporation of bound water molecules.

The crystallographic structure of the catalysts was analyzed by x-ray diffraction (XRD) using a Philips X'Pert Pro Theta-Theta system (model PW 3040/60) using Cu $K_\alpha$ radiation at an operating voltage of 45 kV and a tube current of 40 mA. The particle size, structure and morphology of the catalysts were examined using a Philips F20 field emission scanning electron microscope (HRTEM, Technai 200) and Topcan high resolution scanning electron microscope. The surface area of the catalysts was measured using the BET technique. Elemental composition was measured using ICP-AES (for metals) and combustion analysis (for carbon). The reducibility of the catalysts were characterized using a Temperature Programmed Reduction (TPR) technique (Micromeritics, model AutoChem II 2920) wherein hydrogen uptake by the catalysts is measured as a function of temperature.

The x-ray diffraction patterns for nanoparticle spinel ferrite catalysts are shown in FIG. 10. Curve A shows the diffraction pattern for the as-received (Black-444 powder) sample. The as-received sample comprises a spinel phase of $Cu_{1.5}Mn_{1.5}O_4$, $\alpha$-$Fe_2O_3$, $\beta''$-$Fe_2O_3$ and $Mn_3O_4$. HRTEM indicated that Fe was partially in solid solution in the copper manganese spinel ferrite. The composition of the as-received sample was (in weight percent) 17.7% Fe, 44.7% Mn and 37.6% Cu (with less than 0.5% each of C, Si and Zn). The surface area of the as-received catalyst was about 20 $m^2$/g and comprised individual particles ranging in size from about 30 to 300 nm. Curve B shows the x-ray diffraction pattern after a reduction-oxidation calcination (oxidation at 320° C. for 3 hours). The calcination effects a change in crystal morphology and grain size as indicated by peak broadening in XRD with reduced peak intensity. HRTEM of samples reduced and then oxidized at 320° C. for 3 hours reveal surface clusters or domains of $Cu_{1.5}Mn_{1.5}O_4$ having a size of about 5 nm. Preferably, the nanoparticle spinel ferrite catalysts comprise at least one surface domain with a size of about 5 nm.

The TPR profile for as-received catalyst is shown in FIG. 11 along with comparative TPR profiles for $Mn_3O_4$, CuO and $Fe_2O_3$. During the TPR measurement, samples were quenched from temperatures corresponding to points a, b and c and the quenched samples were studied using XRD. As shown in FIG. 12, the sample quenched from 240° C. (Curve a) exhibits reflections from the spinel phase, $Mn_3O_4$ and $Fe_2O_3$ while the sample quenched from 350° C. (Curve b) exhibits reflections from $Fe_3O_4$, FeO, Cu, MnO and $Mn_3O_4$. This suggests that reduction of the spinel phase starts during the first TPR peak shown in FIG. 11 at about 214° C. and is complete after the second TPR peak at about 299° C. The sample quenched from 750° C. (Curve c) exhibits reflections from Cu, Fe and MnO.

The catalytic activity of as-received and calcined catalyst was tested in the presence of oxygen using a 4 vol. % CO:20 vol. % $O_2$ (balance He) gas mixture at a total flow rate of 1 slm and a furnace heating rate of 12° C./min. Percent CO conversion versus temperature is shown in FIG. 13. For the as-received catalyst, 2% CO conversion was achieved at 114° C. and 50% CO conversion was achieved at 218° C. The catalytic activity was improved after oxidation at 320° C., which was a sufficiently high temperature to remove retained carbon and create surface clusters and an increased density of lattice defects. For example, complete CO conversion (100% conversion) was obtained for the sample oxidized at 320° C. for 1 hour at 180° C. Oxidation at higher temperatures (e.g., to 500° C.) deteriorated the catalyst activity.

The catalytic activity of as-received catalyst was tested in the absence of oxygen using a 4 vol. % CO (balance He) gas mixture at a total flow rate of 300 sccm and a furnace heating rate of 6° C./min. The concentration of CO and $CO_2$ are shown in FIG. 14. The depletion of CO (and the concomitant production of $CO_2$) reached a maximum at about 300° C. suggesting that the as-received catalyst can oxidize CO (i.e., donate oxygen to promote the conversion of CO to $CO_2$) in the absence of an external source of oxygen.

The catalytic efficiency of supported and unsupported nanoparticle spinel ferrite catalysts was tested by incorporating the catalysts in the tobacco cut filler of a standard cigarette that was smoked in a conventional smoking machine. The effluent gases from the cigarette were analyzed by FTIR. An unsupported catalytic sample of 160 mg of Black-444 was incorporated into a test cigarette by sprinkling the spinel ferrite throughout the tobacco used to form the tobacco rod. A 43% reduction in CO was measured relative to a control sample for the unsupported catalyst. Nanoparticle spinel ferrite catalysts supported on alumina were also tested. Samples comprising 16 mg of Black-444 supported on 64 mg and 144 mg of alumina showed a 16% and 30% reduction in CO, respectively. Samples comprising 32 mg of Black-444 supported on 48 mg and 128 mg of alumina showed a 13% and 43% reduction in CO, respectively. Preferably the total loading per cigarette of the nanoparticle spinel ferrite catalyst (either supported or unsupported) is an amount effective to reduce the concentration in mainstream smoke of CO by at least 10% or by at least 30%.

In another exemplary embodiment, a nanoparticle spinel ferrite catalyst can be used in combination with another catalyst. Low temperature and even room temperature catalysts can extend the effective region of the reaction zone for CO to $CO_2$ conversion to the whole cigarette, provided the temperature rise due to the exothermic reaction remains below the ignition temperature of the wrapper.

In addition, any of the wrappers, smoking articles or methods described herein can include additional additives conventionally used in wrappers for smoking articles. These additives can include, for example, additives to control the appearance, e.g., color, of the wrapper, additives to control the burn rate of the wrapper, and/or additives to result in a desired ash appearance and/or web-fillers used in cigarette paper.

The method can be implemented in an easy to use and economical manner as explained herein. The catalyst modified web-filler can be used to: (1) remove carbon monoxide in the mainstream cigarette smoke or sidestream smoke of smoking articles; (2) reduce or eliminate particle entrainment since the catalyst is embedded in the wrapper; (3) remove a target constituent, such as carbon monoxide, highly selectively since the catalyst in the wrapper only catalyzes those gases that are near the wrapper and/or for which the catalyst has an affinity; and/or (4) easily implement in large scale production through the papermaking process.

The tobacco column preferably comprises cut filler of a blend of tobaccos typical of the industry, including blends comprising bright, burley and oriental tobaccos and other blend components, including traditional cigarette flavors. In the preferred embodiment, the shredded tobacco (cut filler) of the tobacco column comprises a blend of bright, burley and oriental tobaccos with or without inclusion of reconstituted tobaccos or any after cut flavorings. Optionally, an expanded tobacco component might be included in the blend to adjust rod density, and flavors may be added. Optionally, a single variety of the aforementioned tobaccos may be used instead of a blend.

While various embodiments have been described, it is to be understood that variations and modifications may be resorted to as will be apparent to those skilled in the art. Such variations and modifications are to be considered within the purview and scope of the claims appended hereto All of the above-mentioned references are herein incorporated by reference in their entirety to the same extent as if each individual reference was specifically and individually indicated to be incorporated herein by reference in its entirety.

What is claimed is:

1. A smoking article comprising:
a nanoparticle spinel ferrite catalyst, and
a cigarette tobacco rod having a wrapper, the wrapper including a web and an optional web-filler material,
wherein the nanoparticle spinel ferrite catalyst comprises copper manganese spinel ferrite, manganese oxide and iron oxide, wherein the copper manganese spinel ferrite catalyst comprises a solid solution of copper, manganese and iron, and wherein the nanoparticle spinel ferrite catalyst comprises at least one surface domain with a size of about 5 nm.

2. The smoking article of claim 1, wherein the nanoparticle spinel ferrite catalyst has an average particle size of less than 50 nm.

3. The smoking article of claim 1, wherein the nanoparticle spinel ferrite catalyst is supported on the web-filler material.

4. The smoking article of claim 1, wherein nanoparticle spinel ferrite catalyst is incorporated in the tobacco rod.

5. The smoking article of claim 1, wherein the web-filler material includes an oxide, a carbonate, or a hydroxide of a Group II, Group III or Group IV metal.

6. The smoking article of claim 1, wherein the web-filler material is selected from the group consisting of $CaCO_3$, $TiO_2$, $SiO_2$, $Al_2O_3$, $MgCO_3$, MgO and $Mg(OH)_2$, and an average particle size of the web-filler material is 0.1 to 10 microns.

7. The smoking article of claim 1, wherein the wrapper is a first wrapper, and the smoking article further comprises a second wrapper, and the nanoparticle spinel ferrite catalyst is incorporated in the first wrapper and/or in the second wrapper.

8. The smoking article of claim 7, wherein a total amount of nanoparticle spinel ferrite catalyst in the second wrapper is less than 1 mg.

9. The smoking article of claim 1, wherein the wrapper has a radially inner portion and a radially outer portion, the radially inner portion having a first loading of the nanoparticle spinel ferrite catalyst and the radially outer portion having a second loading of the nanoparticle spinel ferrite catalyst.

* * * * *